United States Patent
Brown

(10) Patent No.: US 9,262,468 B1
(45) Date of Patent: Feb. 16, 2016

(54) SYSTEM FOR GENERATING DIGITAL EVENT MATERIAL AND EVENT-BASED UPDATING OF USER PROFILES TO CREATE NEW COMMUNITIES

(71) Applicant: Invent.ly, LLC, Woodside, CA (US)

(72) Inventor: Stephen J. Brown, Woodside, CA (US)

(73) Assignee: Invent.ly, LLC, Woodside, CA (US)

( * ) Notice: Subject to any disclaimer, the term of this patent is extended or adjusted under 35 U.S.C. 154(b) by 0 days.

(21) Appl. No.: 14/480,923

(22) Filed: Sep. 9, 2014

Related U.S. Application Data

(63) Continuation of application No. 13/784,214, filed on Mar. 4, 2013, now Pat. No. 8,892,489, which is a continuation-in-part of application No. 13/442,157, filed on Apr. 9, 2012, now Pat. No. 8,473,440, which is a continuation of application No. 12/215,957, filed on Jun. 30, 2008, now Pat. No. 8,156,064, which is a continuation-in-part of application No. 11/999,249, filed on Dec. 3, 2007, now Pat. No. 8,533,269.

(60) Provisional application No. 60/948,157, filed on Jul. 5, 2007.

(51) Int. Cl.
*G06F 17/00* (2006.01)
*G06N 5/00* (2006.01)
*G06F 17/30* (2006.01)

(52) U.S. Cl.
CPC .................. *G06F 17/30377* (2013.01)

(58) Field of Classification Search
USPC .......................................................... 706/45
See application file for complete search history.

(56) References Cited

U.S. PATENT DOCUMENTS

| | | |
|---|---|---|
| 6,463,385 B1 | 10/2002 | Fry |
| 6,594,673 B1 | 7/2003 | Smith et al. |
| 6,829,612 B2 | 12/2004 | Neulight |
| 7,117,254 B2 | 10/2006 | Lunt et al. |
| 7,118,153 B2 | 10/2006 | Kitayama et al. |
| 7,167,910 B2 | 1/2007 | Farnham et al. |

(Continued)

FOREIGN PATENT DOCUMENTS

WO    2008016634 A2    2/2008

OTHER PUBLICATIONS

Single-event phenomena in GaAs devices and circuits McMorrow, D.; Weatherford, T.R.; Buchner, S.; Knudson, A.R.; Melinger, J.S.; Tran, L.H.; Campbell, Arthur B. Nuclear Science, IEEE Transactions on Year: 1996, vol. 43, Issue: 2 pp. 628-644, DOI: 10.1109/23.490906 Referenced in: IEEE Journals & Magazines.*

(Continued)

*Primary Examiner* — Michael B Holmes
(74) *Attorney, Agent, or Firm* — Christopher P. Maiorana, PC

(57) ABSTRACT

System and method for event-based updating of user profiles UP of users U in a social network and formation of new communities based on a resonance condition. A database of user profiles UP with profile domains D based on self-reports as well as observed network behaviors is deployed. The user profiles UP of users U in groups G attending an event are re-compiled by an event-based updating module based on event responses ER. Further, the event-based updating module identifies a profile change $\Delta P^*$ in at least one of the profile domains D of user profiles UP, and the new community is formed by the event-based updating module from a subgroup SG whose profile change $\Delta P^*$ indicates a mutual resonance or consensus in their event responses ER.

20 Claims, 14 Drawing Sheets

(56) References Cited

U.S. PATENT DOCUMENTS

| | | | |
|---|---|---|---|
| 7,188,153 B2 | 3/2007 | Lunt et al. | |
| 7,720,855 B2 * | 5/2010 | Brown | G06Q 10/10 707/758 |
| 7,801,752 B2 | 9/2010 | Neulight | |
| 7,925,743 B2 | 4/2011 | Neely et al. | |
| 8,032,649 B2 | 10/2011 | Gupta et al. | |
| 8,037,506 B2 | 10/2011 | Cooper et al. | |
| 8,055,552 B2 | 11/2011 | Kalaboukis | |
| 8,096,477 B2 * | 1/2012 | Brown | G06Q 10/10 235/462.09 |
| 8,145,584 B2 | 3/2012 | Juan et al. | |
| 8,156,064 B2 * | 4/2012 | Brown | G06Q 30/02 706/46 |
| 8,200,757 B2 * | 6/2012 | Brown | G06F 17/30731 709/204 |
| 8,224,714 B2 | 7/2012 | Yost | |
| 8,473,440 B2 * | 6/2013 | Brown | G06Q 30/02 706/45 |
| 8,533,269 B2 * | 9/2013 | Brown | G06F 17/30867 345/619 |
| 8,645,383 B2 * | 2/2014 | Brown | G06F 17/30731 707/737 |
| 8,851,380 B2 * | 10/2014 | Brown | G06Q 10/10 235/375 |
| 8,892,489 B2 * | 11/2014 | Brown | G06Q 30/02 706/45 |
| 8,930,490 B2 * | 1/2015 | Brown | G06F 17/30731 709/217 |
| 8,990,309 B1 * | 3/2015 | Brown | G06F 17/30867 709/205 |
| 9,043,257 B1 * | 5/2015 | Brown | G06Q 30/02 706/45 |
| 9,098,574 B2 * | 8/2015 | Brown | G06F 17/30731 |
| 2001/0049470 A1 | 12/2001 | Mault et al. | |
| 2002/0109600 A1 | 8/2002 | Mault et al. | |
| 2004/0088325 A1 | 5/2004 | Elder et al. | |
| 2006/0167387 A1 | 7/2006 | Buchholz et al. | |
| 2006/0271960 A1 | 11/2006 | Jacoby et al. | |
| 2007/0174389 A1 | 7/2007 | Armstrong et al. | |
| 2007/0233736 A1 | 10/2007 | Xiong et al. | |
| 2008/0005076 A1 | 1/2008 | Payne et al. | |
| 2008/0046336 A1 | 2/2008 | Mosleh | |
| 2008/0059256 A1 | 3/2008 | Lynch | |
| 2008/0086318 A1 | 4/2008 | Gilley et al. | |
| 2008/0103878 A1 | 5/2008 | Leach et al. | |
| 2008/0103907 A1 | 5/2008 | Maislos et al. | |
| 2008/0109296 A1 | 5/2008 | Leach et al. | |
| 2008/0126318 A1 | 5/2008 | Frankovitz | |
| 2008/0126928 A1 | 5/2008 | de Leon et al. | |
| 2009/0012925 A1 | 1/2009 | Brown | |
| 2009/0112611 A1 | 4/2009 | Brown | |
| 2009/0132652 A1 | 5/2009 | Athale et al. | |
| 2009/0144639 A1 | 6/2009 | Nims et al. | |
| 2009/0150786 A1 | 6/2009 | Brown | |
| 2009/0249244 A1 | 10/2009 | Robinson et al. | |
| 2009/0287687 A1 | 11/2009 | Martire et al. | |
| 2010/0049608 A1 | 2/2010 | Grossman | |
| 2010/0217645 A1 | 8/2010 | Jin et al. | |
| 2010/0306119 A1 | 12/2010 | Banerjee et al. | |
| 2011/0022462 A1 | 1/2011 | Collins et al. | |
| 2011/0161130 A1 | 6/2011 | Whalin et al. | |
| 2011/0161167 A1 | 6/2011 | Jallapuram | |
| 2011/0191809 A1 | 8/2011 | Briggs et al. | |
| 2011/0258125 A1 | 10/2011 | Iyer | |
| 2012/0209912 A1 | 8/2012 | Brown | |
| 2014/0025654 A1 * | 1/2014 | Brown | 707/705 |

OTHER PUBLICATIONS

Simulation and improvement of multi-product multi-stage processing system based on witness Gai Ma; Yachao Wang Industrial Engineering and Engineering Management, 2009. IE&EM '09. 16th International Conference on Year: 2009 pp. 1856-1859, DOI: 10.1109/ICIEEM.2009.5344298 Referenced in: IEEE Conference Publications.*

Use of GI/G/1 queuing approximations to set tactical parameters for the simulation of MRP systems Enns, S.T.; Sangjin Choi Simulation Conference, 2002. Proceedings of the Winter Year: 2002, vol. 2 pp. 1123-1129 vol. 2, DOI: 10.1109/WSC.2002.1166366 Referenced in: IEEE Conference Publications.*

Creating musical structure from the temporal dynamics of soundscapes Maguire, R. Information Science, Signal Processing and their Applications (ISSPA), 2012 11th International Conference on Year: 2012 pp. 1432-1433, DOI: 10.1109/ISSPA.2012.6310526 Referenced in: IEEE Conference Publications.*

Boudway, Kickstarter: Financing Small Movies Online, www.businessweek.com, May 26, 2011, pp. 9-10, Bloomberg Businessweek, USA.

DELO, Movie Studios Have New Ally in Distribution Plans: Facebook, www.adage.com, Oct. 28, 2011, pp. 1-4, Advertising Age, New York, USA.

Facebook, About Facebook, pp. 1-2. www.facebook.com/about.php, date unknown.

Kohn, DIY With a Little Help: OpenIndie Hopes to Bring Theaters within Filmmakers' Reach, www.indiewire.com, Oct. 1, 2009, pp. 1-3, OpenIndie, USA.

Martin, OpenIndie Seeks to Open World to Filmmakers, www.blog.moviefone.com, Oct. 3, 2009, pp. 1-4, USA.

Myspace, About Us, p. 1. MySpace. www.myspace.com/index.cfm?fuseaction=misc.aboutus, date unknown.

Toumarkine, Kickin' it: Innovative impresario Kickstarter helps indie filmmakers get funding, www.filmjournal.com, Apr. 18, 2012, pp. 1-4, Film Journal International.

Tugg, The Movies You Want at Your Local Theater, www.tugg.com, 2013, pp. 1-3, Tugg Inc., USA.

Twitter, Twitter FAQ, pp. 1-13, Twitter. http://help.twitter.com/index.php?pg=kb.printer.friendly&id=5, date unknown.

* cited by examiner

SYSTEM FOR GENERATING DIGITAL EVENT MATERIAL AND EVENT-BASED UPDATING OF USER PROFILES TO CREATE NEW COMMUNITIES

CROSS-REFERENCE TO RELATED APPLICATIONS

This application relates to U.S. Ser. No. 13/784,214, filed Mar. 4, 2013, which relates to U.S. Ser. No. 13/442,157, filed Apr. 9, 2012, now U.S. Pat. No. 8,473,440, which relates to U.S. Ser. No. 12/215,957, filed Jun. 30, 2008, now U.S. Pat. No. 8,156,064, which (i) relates to U.S. Provisional Application No. 60/948,157, filed Jul. 5, 2007 and (ii) which relates to U.S. Ser. No. 11/999,249, filed Dec. 3, 2007, now U.S. Pat. No. 8,533,269, each of which is incorporated by reference in their entirety.

FIELD OF THE INVENTION

This invention relates generally to systems and methods for updating of user profiles of users in a social network. More particularly, the present invention relates to updating of user profiles based on an event that the users experience as well as the management of associated digital event materials and creation of new communities among the users.

BACKGROUND ART

There are many Internet-based or web-based social networks that interconnect users and allow them to interact. To facilitate such interactions, each user builds their user profile to establish a network identity. Having a network identity that properly reflects the user's characteristics is important. A user's profile allows him or her to connect to other users who are already friends, or users whom the user does not yet know. Once connected, the users can interact over common interests, values, needs or goals.

Improperly constructed user profiles present obstructions to meaningful user interactions on social networks. Inaccurate profiles often occur in social networks that allow users to build their profiles on self-reported data only. Users can easily provide an inaccurate portrayal of themselves in self-reports. In other words, users are likely to game the system to attempt to look better or different than their actual selves.

Poorly constructed user profiles present subsequent system challenges, as they frequently form the basis for computer-generated matching recommendations or other suggestions. Matching recommendations can be for individual interactions as in the case of dating matches between two users. In other cases, the suggestions can be for certain activities or group interactions, such as new community formation among a group of users. Unfortunately, when the recommendations and suggestions are based on improper user profiles, the social value inherent in the social network cannot be unlocked. The matches and suggestions may even prejudice the users against future reliance on social network suggestions for matches with other users or groups that the user does not already know in the real world.

In order to make user profiles more accurate, some prior art suggests using network behaviors for profiling. For example, U.S. Pat. No. 8,156,064 to Brown discusses collecting user network behaviors to obtain more correct user profiles. Specifically, Brown teaches profiling with respect to one or more domains, and associating network behaviors with the one or more domains by corresponding scale factors. The scale factors are based on a relevance of the observed network behavior to the domain used in the profiling. Furthermore, the scale factors are refined based on user ratings obtained from user inputs.

Brown's teachings help to eliminate many challenges faced by self-reported user profiling and the resulting inaccurate profile matches. However, numerous problems remain. The lives of users are dynamic and many events have the power to change them in major ways. These changes, some of which are large, discontinuous and may even involve complete shifts in outlook are not generally predictable. However, it would be very desirable for user profiles to change dynamically with the users to reflect the users' changed characteristics.

There are presently no viable systems or methods to specifically track events that generate user profile altering experiences. Furthermore, no solutions exist to properly contextualize events and to treat event-based changes in user profiles.

OBJECTS AND ADVANTAGES

In view of the shortcomings of the prior art, it is an object of the present invention to provide a method and a system that generate digital event material and update user profiles based on the corresponding event. It is a further object of the invention to leverage the event-based updating of user profiles by monitoring the event-based changes, and to make recommendations to users based on these profile changes. The recommendations can include profile matching as well as suggestions for the formation of new communities.

Another object of the invention is to leverage the event-based update in re-compiling user profiles and in enhancing aspects of the event. In particular, user responses ER associated with the digital event material or the physical event can be used to perform various auxiliary functions, including better-targeted advertising, facilitation in the planning and putting on of the event, and even funding the production of the physical event.

These and numerous other object and advantages will become apparent upon reading the detailed description of the present invention.

SUMMARY OF THE INVENTION

Many of the objects and advantages of the invention are secured by a method for generating digital event material and for event-based updating of user profiles UP of users U in a social network. According to the method, an application server is provided and equipped with support modules. The support modules are used to maintain a database of user profiles UP and to mediate interactions involving users U.

The method calls for compiling a database of user profiles UP with profile domains D. The compilation of user profiles UP is based on self-reports as well as observed network behaviors. Additional data can be derived from cross-references, e.g., from information gathered in other social networks.

In another step of the method, the digital event material and applicable delivery parameters of an event E are provided to at least one of users U. This step is performed by a distribution server equipped with a viral logic. The viral logic enables at least one group G of users U to self-organize and to communicate a commitment to event E. Among many other options, the commitment may indicate a desire to attend or a rating of event E. A rules engine determines when the commitment reaches a certain threshold by reviewing event responses ER of users U.

In accordance with the method of invention, user profiles UP of the one or more groups G are re-compiled by an event-based updating module based on event responses ER from users U. Further, the event-based updating module identifies a profile change ΔP* in at least one of the profile domains D of user profiles UP. Now, by drawing from the one or more groups G based on profile change ΔP* a new community can be formed.

Preferably, the support modules include a participant interaction module. This module supports the connecting of users U via at least one network device to the application server. Further, the participant interaction module supports logging users U into the social network and interacting. In particular, interactions among the at least one group G are supported. In practice, each of the users U has at least one network device assigned to them for connecting to the application server and logging into the social network via participant interaction module. Typical network devices include, without limitation, portable and non-portable devices such as smartphones, personal digital assistants, portable computers, tablets, work stations, desktop computers and media players.

The new community is formed by the event-based updating module from a subgroup SG of the one or more groups G based on event responses ER received from users U. Specifically, a subgroup SG whose profile change ΔP* indicates a mutual resonance or consensus in their event responses ER is selected to form the new community. Preferably, the event-based updating module indicates or flags subgroup SG thus selected for follow-on communication and/or activities through a community management module. The follow-on communication by community management module can be targeted specifically for subgroup SG and may include any action such as advertising, surveying, community-building, booking services, pre-event and/or post-event support services and any combination thereof.

In a preferred implementation of the method of invention, the digital event material is a preview associated with event E. In this case, event E can be a movie screening and the actions can include pre-event advertising (e.g., embedded in the preview), post-event advertising, pre-event booking, surveying and community-building. It should be noted, that follow-on communication by community management module may be indicated for some user or users U that are not members of subgroup SG.

The event-based updating module can link or identify the new community with event E that precipitated its formation. Furthermore, the same updating module can map the new community to one or more other social groups based on shared causes. The determination of shared causes can be based on comparison of user profiles UP or other tests and metrics.

In some embodiments, the method further provides for scheduling and delivery of the digital event material by the distribution server and the viral logic to a physical event venue of event E. The venue typically depends on the type of event E. Exemplary events include film screenings, concerts, book signings, speaking events, conferences, un-conferences, art shows, festivals, athletic events, religious events, political events, protests, games, parties, dinners, receptions and poker nights. Correspondingly, the digital event material can include a preview, a movie, a digital presentation, a digital book, a digital score, a digital statement, a digital audio file, a digital game and any combination thereof.

In certain cases, it is advantageous to share event responses ER with users U on their network devices. These users U may include ones outside subgroup SG or group G. For user convenience, the event responses ER can be formatted to be smartphone notifications, e-mails, phone calls and SMS messages. Furthermore, also for user convenience, the event-updating module is configured to receive event responses ER in a format such as a rating, a structured response or even an unstructured response.

It is advantageous to include in the digital event material an advertisement that is selected by the viral logic based on user profiles UP of users U belonging to group G. Of course, post-event, or other additional advertising may be targeted at subgroup SG.

To facilitate in the planning and putting on of event E, the viral logic can implement booking for event E among users U belonging to group G. For this purpose, the status of reservations to event E can be shared among users U of group G, e.g., by the participant interaction module. Additionally, the participant interaction module can provide a local organizer function to support at least one local organizer of group G chosen among corresponding users U. To incentivize one or more local organizers, a local organizer module can be provided to support a direct connection between them and the rules engine for privileged communications. The rules engine can contain financial and/or other incentives pre-set by sponsors, producers, directors, hosts and other parties involved in event E to incentivize such local organizers.

The rules engine can deploy another convenient aspect of the method of invention for event sponsors and hosts with the aid of a threshold function. The threshold function prevents scheduling of physical event E at the physical event venue based on at least one condition such as an amount of funding required to put on the event E, a size of group G, user profiles UP of users U belonging to group G, a geographical location of users U belonging to group G.

The method of invention can take advantage of outside information sources. For example, in compiling user profiles UP, and especially those belonging to group G and even more so those of subgroup SG, the application server can retrieve observed network behaviors and/or self-reports or user data obtained in any other well-known manner from other social network profiles. For example, observed network behaviors are represented by a visual design of a profile page, media choices, media favorites and history. Thus, user profiles UP of users U can have profile information derived from at least one different social network.

The invention also extends to a system for generating digital event material and event-based updating of user profiles UP in a social network. The system uses an application server with support modules to maintain a database of user profiles UP and for mediating interactions involving users U. A database of user profiles UP with requisite profile domains D is compiled from self-reports and observed network behaviors of users U and stored on a suitable storage medium to which the application server has access.

The system uses a distribution server equipped with a viral logic for providing the digital event material and delivery parameters pertaining thereto for an event E to at least one of users U. The viral logic, e.g., a mobile executable code snippet, enables one or more groups G of users U to self-organize and to communicate their commitment to event E. A rules engine belonging to the system determines when the commitment reaches a certain threshold or level based on event responses ER of users U. An event-based updating module re-compiles user profiles UP of users U belonging to group G based on event responses ER. It also identifies a profile change ΔP* in at least one of the profile domains D of user profiles UP of the corresponding users U.

Preferably, one of the support modules is a participant interaction module for supporting the connections of users U via one or more network devices assigned to them to the application server and logging them into the social network.

The system of invention supports the formation of a new community from the one or more groups G. The event-based updating module, or the application server in communication with the former, uses the profile change ΔP* for forming the new community. Once again, indication of mutual resonance evidenced by profile change ΔP* is the basis for selecting a subgroup SG of the one or more groups G to form the new community.

The system of invention can include an event-based updating module for indicating subgroup SG for follow-on communication by a community management module with items such as an advertisement, a survey, a community-building communication, a booking, pre-event support, post-event support and any combination of such items. Preferably, the event-based updating module identifies the new community with event E and may map it to another social group based on a share cause.

The system can have at least one execution module that cooperates with the viral logic to schedule and deliver the digital event material form the distribution server to a physical event venue of event E. Furthermore, the network devices can have a function for sharing event responses ER with users U in formats compatible with smartphones, e-mails, phonecalls and SMS messages. Event responses ER can have a format that supports rating, as well as structured and unstructured responses.

In embodiments where the digital event material includes an advertisement, it is preferable that the latter be selected by the viral logic based on user profiles UP of users U in group G. Further, the viral logic has an evaluation function for making this selection.

In a preferred embodiment, the application server has a module for performing at least one function chosen from among block reservation support, ticket allocation monitoring, dissemination of ticket allocation information, event feedback collection. Additionally, the rules engine has a threshold function for preventing scheduling of the digital event material based on at least one auxiliary rule that can include the amount of funding available for event E, size of group G, user profiles UP of users U in group G, geographical location of users U in group G.

Clearly, the method and system of invention find many advantageous embodiments. The details of the invention, including its preferred embodiments, are presented in the below detailed description with reference to the appended drawing figures.

BRIEF DESCRIPTION OF THE DRAWING FIGURES

Figure 8A:
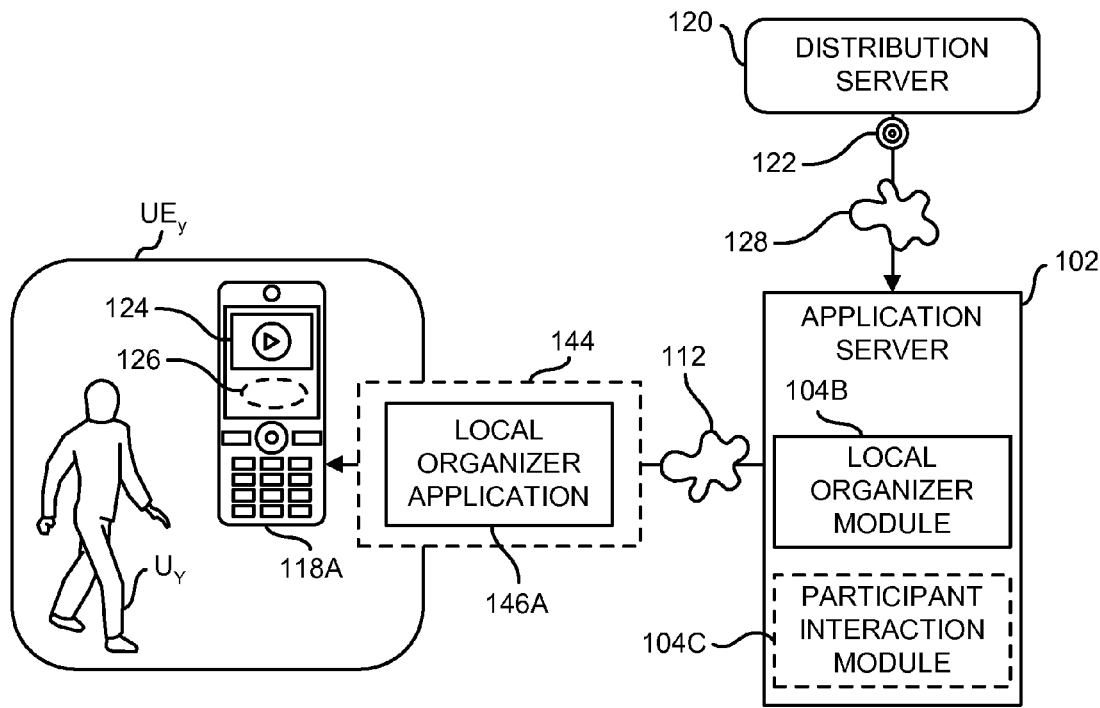
Figure 8B:
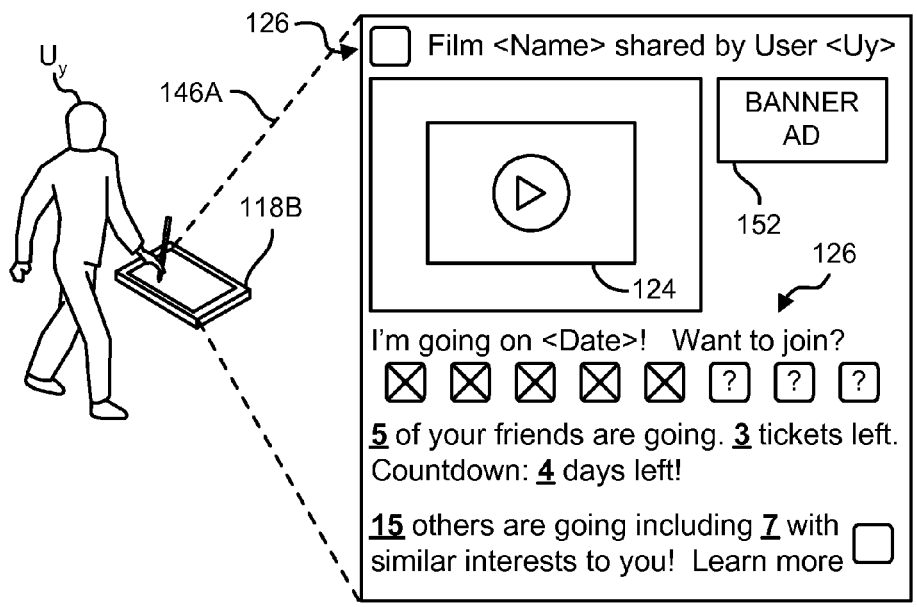

FIGS. 8A-B are diagrams showing a preferred implementation of a local organizer application.

Figure 9A:
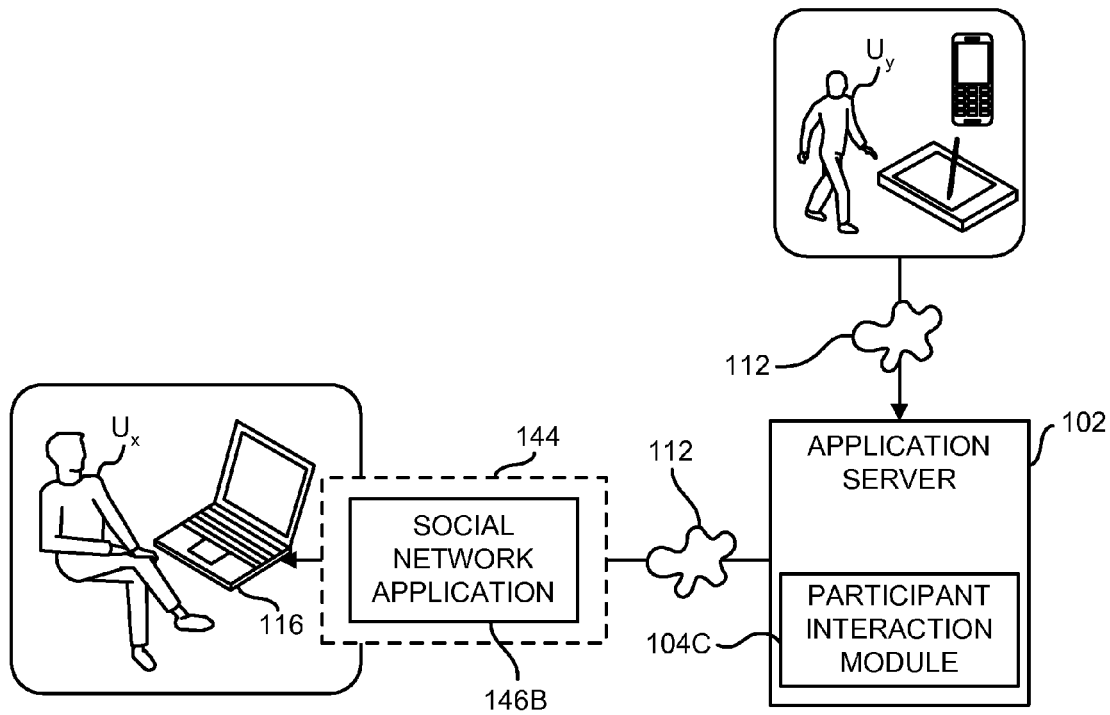
Figure 9B:
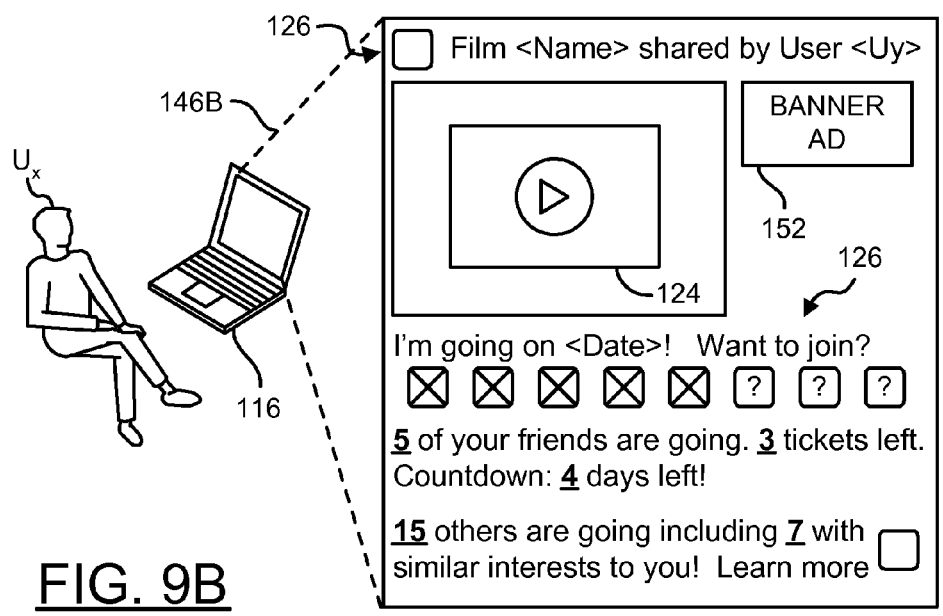

FIGS. 9A-B are diagrams showing a preferred implementation of a social network application and of a particular user viewing their invitation to event $E_i$ sent by the local organizer.

Figure 10:
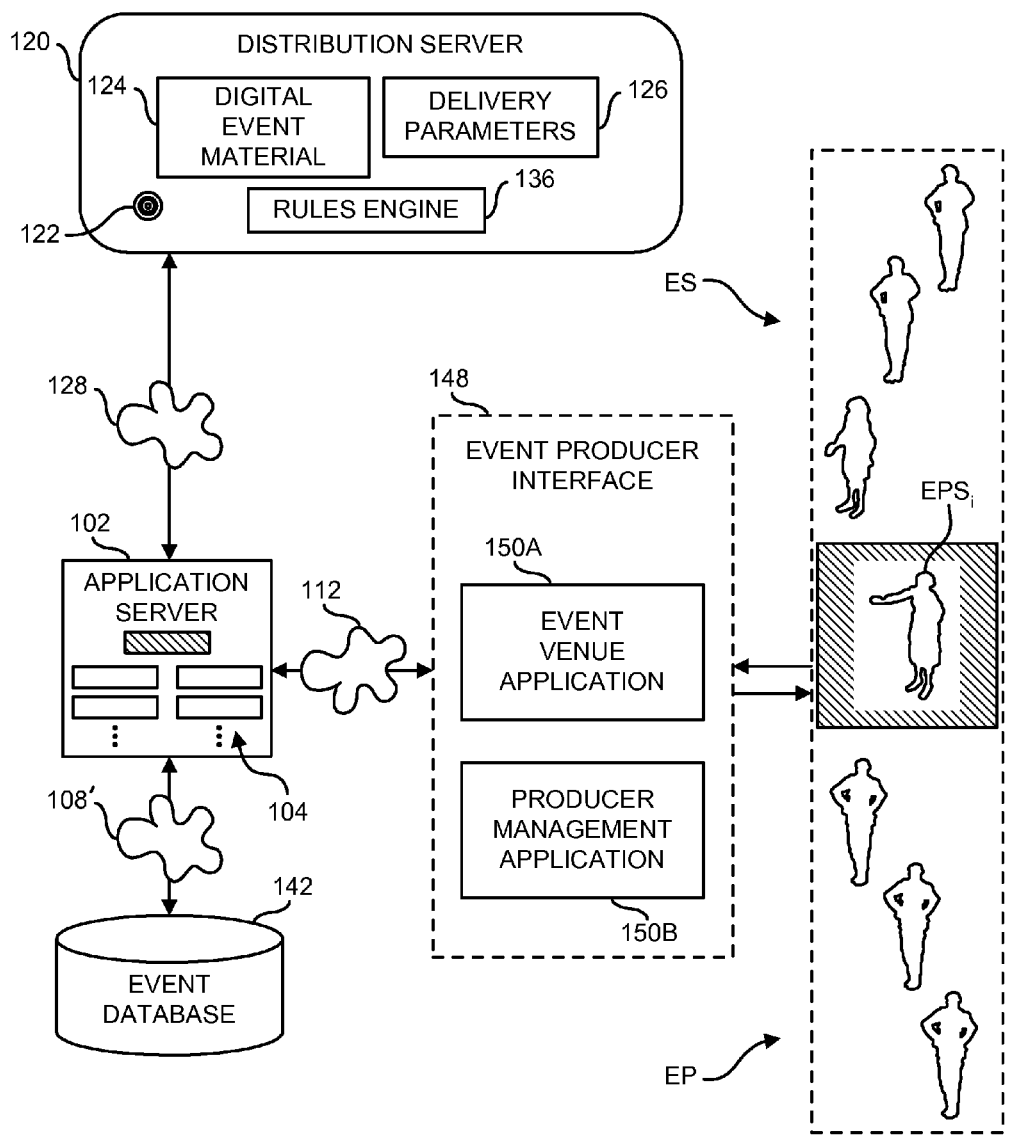

FIG. 10 is a diagram showing a preferred implementation of the event producer interface for management of digital event materials, delivery parameters, advertising and aspects of production of event $E_j$.

Figure 11:
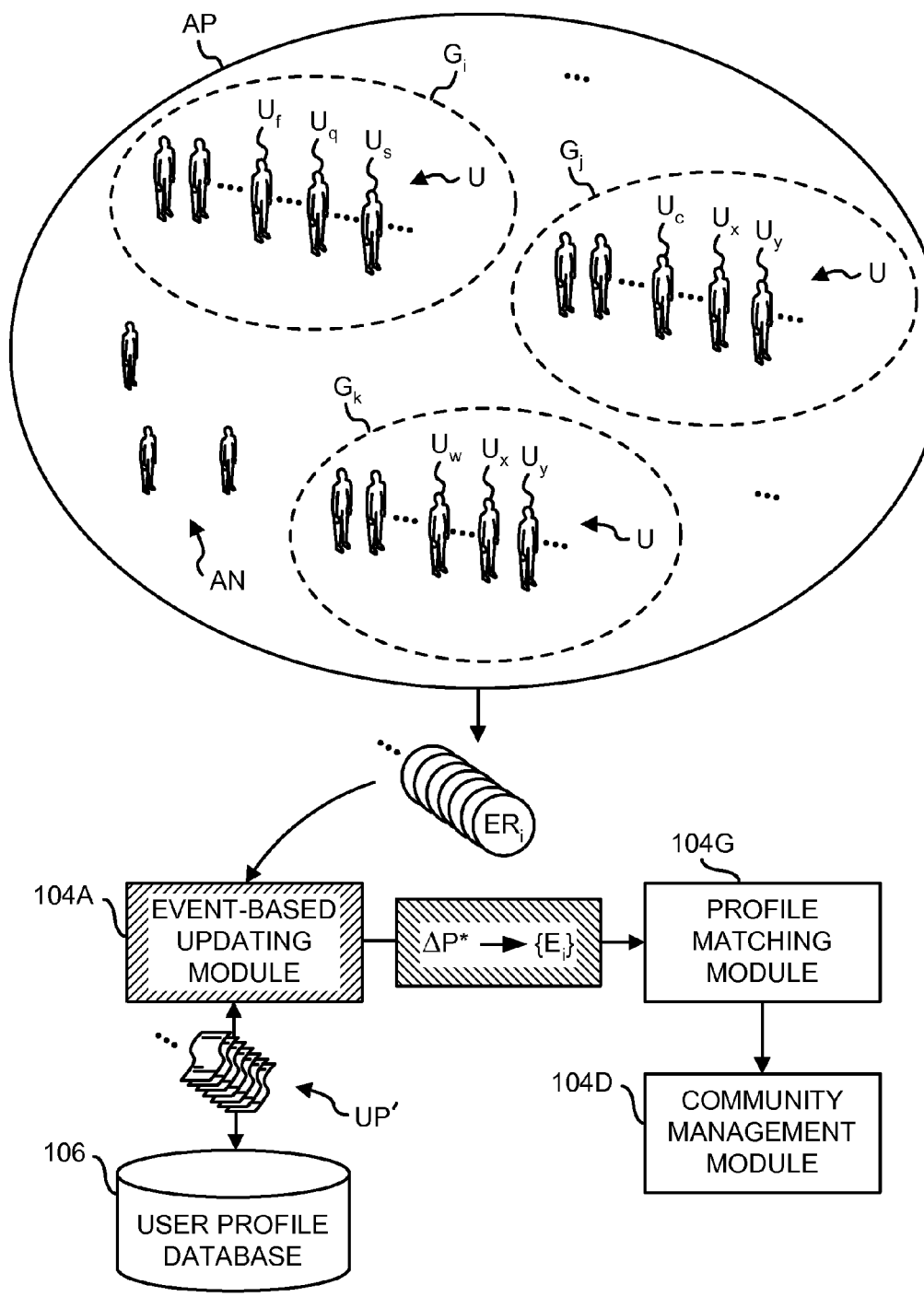

FIG. 11 is a diagram illustrating event-based formation of a new community.

Figure 12:
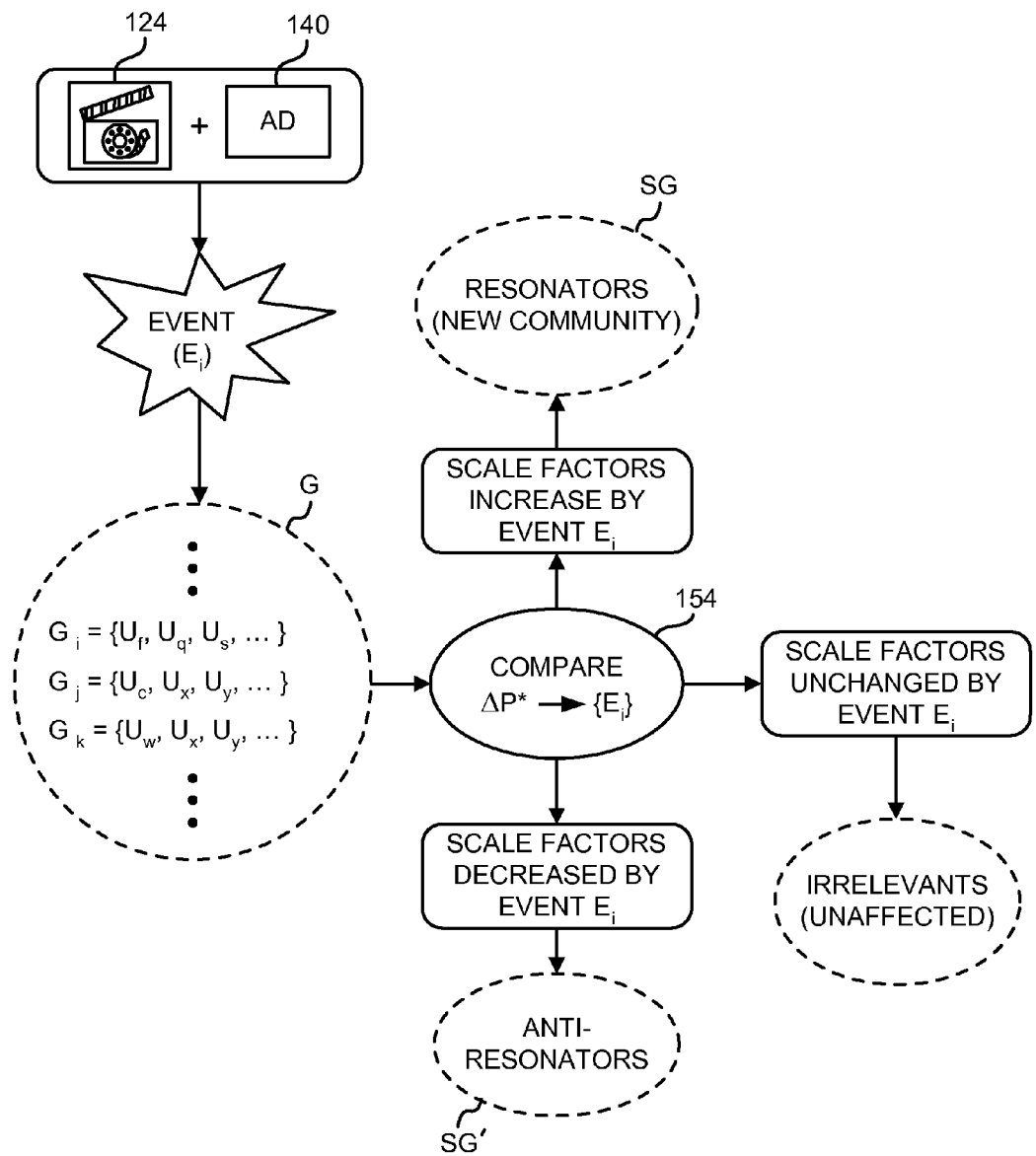

FIG. 12 is a diagram showing a preferred method of resonance testing for event-based new community formation.

Figure 13:
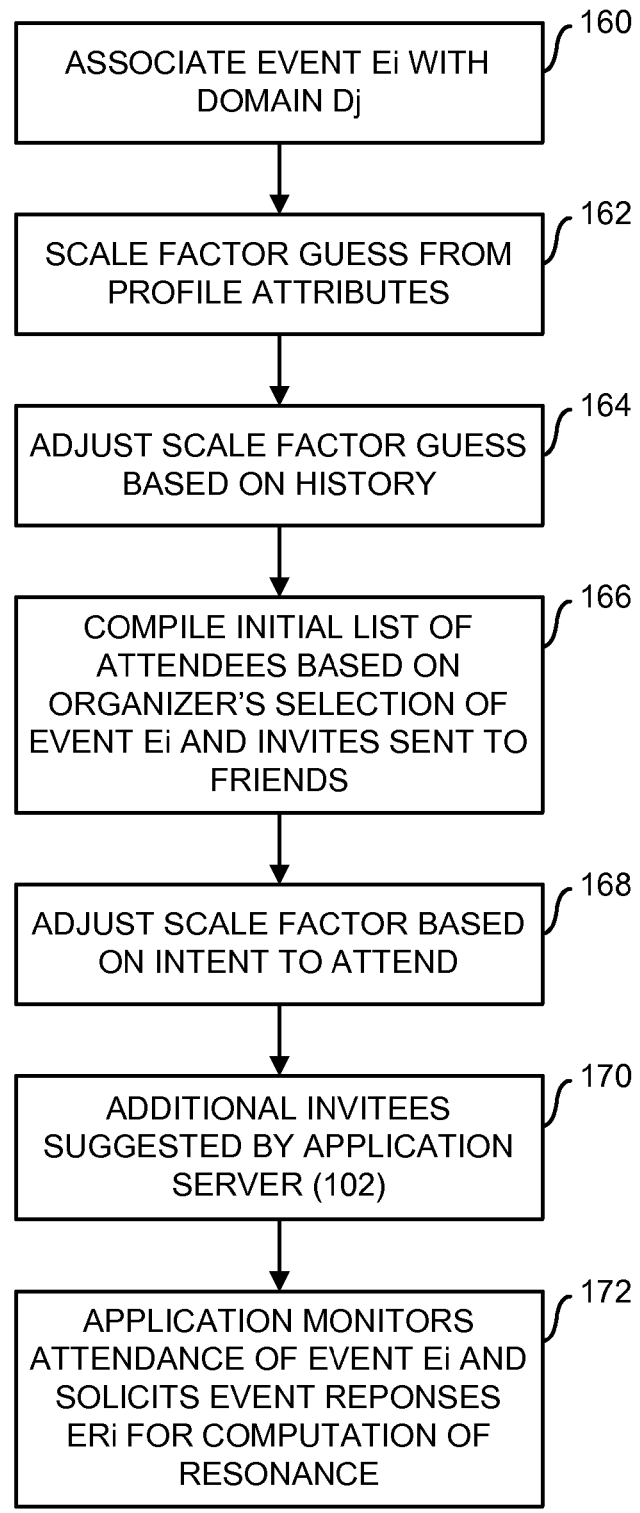

FIG. 13 is a flowchart describing the initial assignment and subsequent adjustment or recalibration of scale factors.

Figure 14:
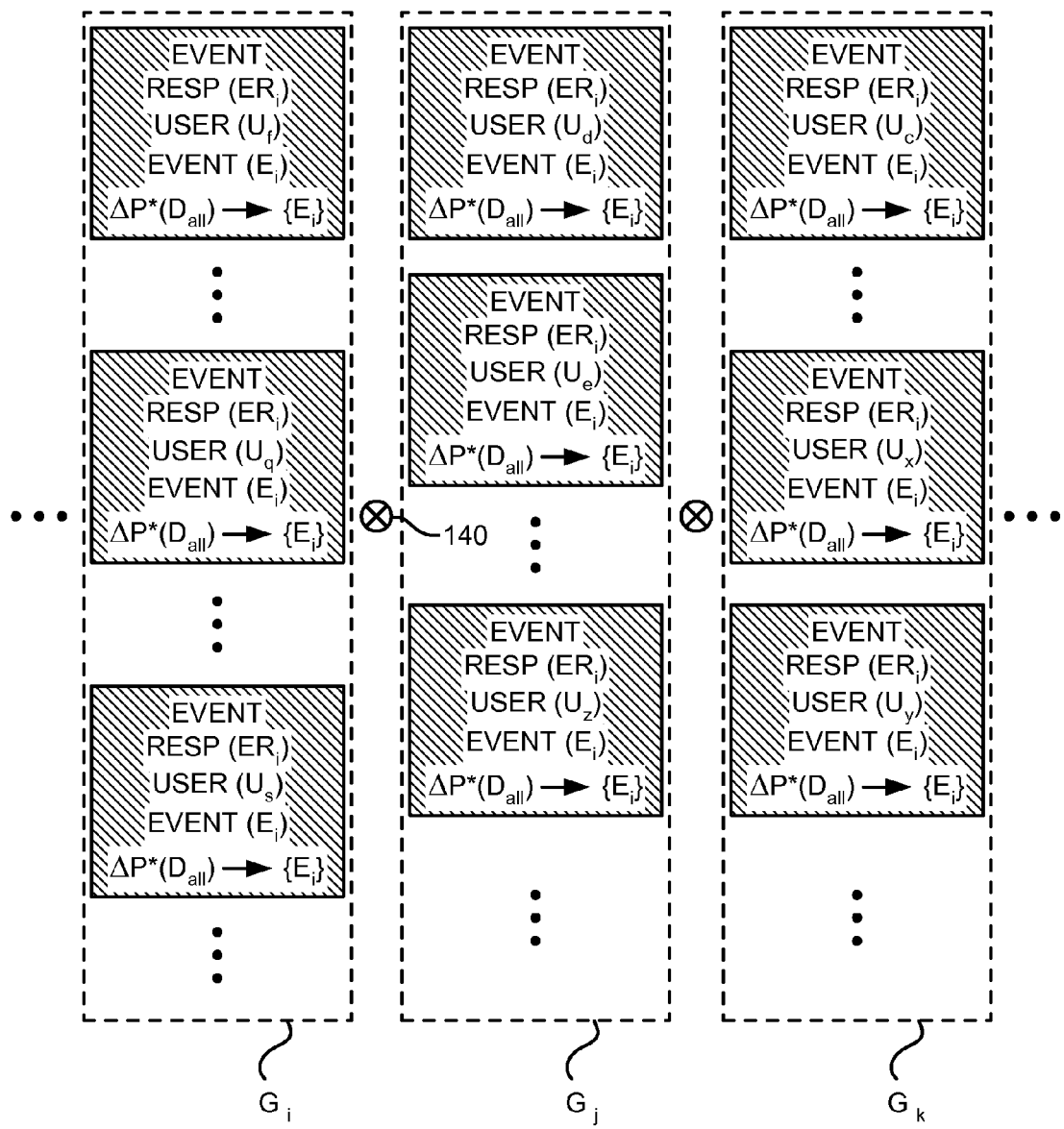

FIG. 14 is a diagram showing how to use tensor spaces to handle more advanced aspects of new community formation.

DETAILED DESCRIPTION

The drawing figures and the following description relate to preferred embodiments of the present invention by way of illustration only. It should be noted that from the following discussion, alternative embodiments of the methods and systems disclosed herein will be readily recognized as viable alternatives that may be employed without departing from the principles of the claimed invention. Likewise, the figures depict embodiments of the present invention for purposes of illustration only. One skilled in the art will readily recognize from the following description that alternative embodiments of the methods and systems illustrated herein may be employed without departing from the principles of the invention described herein.

Figure 1:
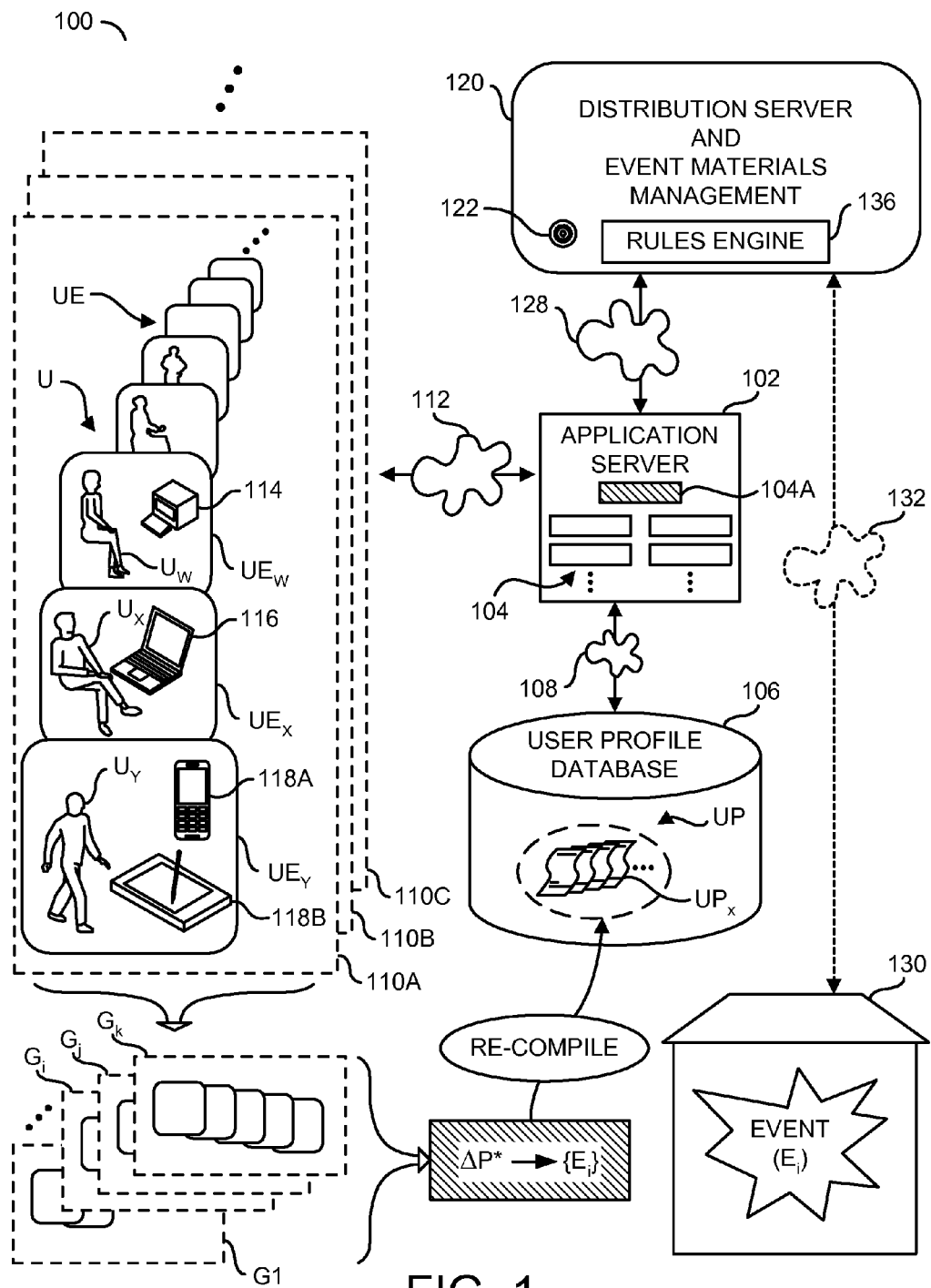
FIG. 1 is a high-level diagram of a system according to the invention.

The present invention will be best understood by first reviewing a system 100 according to the invention as shown in the high-level diagram of FIG. 1. System 100 has an application server 102 that can include one or more actual computers. For example, server 102 can be instantiated by one or more computers in a single computer cluster or across multiple clusters.

Server 102 has a number of support modules 104, including an event-based updating module 104A. Sever 102 can have additional resources such as local storage (e.g., SATA, optical, flash or other suitable storage media) as well as various network connectivity and input/output resources, as is well known to those skilled in the art.

Server 102 is connected to a user profile database 106 via a connection 108. It should be noted, that user profile database 106 can be local, i.e., in the same cluster as the one hosting server 102. In this case, connection 108 is a local connection established on a Local Area Network (LAN) or running through a wired or wireless private connection. On the other hand, when resources 104 include sufficient storage capacity, user profile database 106 can even be located in server 102 on its local storage device (e.g., hard disk drive or flash drive (SSD)) with an internal connection thereto.

As shown in the diagram of FIG. 1, user profile database 106 is remote from server 102. Here, connection 108 is established on a Wide Area Network (WAN), which can include the Internet or any other suitable network including wired and wireless links.

System 100 uses application server 102, and more particularly its support modules 104 to mediate interactions involving users U of social network 110A. In fact, server 102 as shown can support with its modules 104 interactions between users U belonging to a number of social networks, such as social networks 110A, 110B, 110O and any additional networks generally indicated by an ellipsis in FIG. 1. For reasons of clarity, the present explanation will mainly focus on one social network, namely social network 110A.

To support and maintain network 110A, server 102 is provided with a connection 112 to users U. Since users U are in various geographical locations, connection 112 is preferably established via a Wide Area Network (WAN) such as the Internet and/or various wireless networks, including cellular networks. Thus, under mediation of server 102 any particular user U of social network 110A can connect with any other user U on network 110A in accordance with any specific rules of social network 110A.

For illustration purposes, even though users U are in disparate locations and employ different connections and connectivity modes, those belonging to social network 110A are shown within a single dashed box. In social network 110A each one of users U is further associated with his or her user environment UE. User environment UE is indicated by a rounded box and includes information about geographical location (when available), connection type and other important technical and context parameters. Users $U_w$, $U_x$, $U_y$ in their corresponding user environments $UE_w$, $UE_x$, $UE_y$ are individually designated in FIG. 1 for purposes of the present teaching.

Every user U in social network 110A has one or more network devices assigned to them. Network devices are required for connecting to application server 102 via connection 112 and for logging into social network 110A maintained between users U by support modules 104 of server 102. In particular, users $U_w$, $U_x$, $U_y$ have network devices 114, 116 and 118A, 118B, respectively. Device 114 is a desktop computer, device 116 is a portable computer (e.g., a laptop), and devices 118A, 118B are embodied by a smartphone and a tablet, respectively. Of course, network devices can also include other portable and non-portable electronic devices capable of establishing connectivity with server 102 via connection 112. For example and without limitation, network devices can include personal digital assistants, work stations, media players and others.

User profile database 106 contains user profiles UP that are organized with the aid of profile domains D, as described below in reference to FIG. 2. The reader is further directed to U.S. Pat. No. 8,156,064 and U.S. Patent Application 2009/0144369 by Brown for general teachings related to organizing user profiles with the aid of profile domains.

Among user profiles UP stored in database 106, user profile $UP_x$ belonging to user $U_x$ is shown explicitly for illustration purposes. It should be noted, that database 106 may be partitioned among several actual storage devices such as disk drives, optical drives, flash drives or other suitable storage media. It is also understood that it is the collection of these storage devices, which may even reside in separate locations, that is represented by database 106 in FIG. 1. In any case, user profiles UP are stored on a suitable storage medium in database 106 to which application server 102 has access.

System 100 uses a distribution server 120 equipped with a viral logic 122 for providing digital event material and delivery parameters pertaining thereto. Both digital event material and delivery parameters depend on the type of event E. Exemplary candidate events include film screenings, concerts, book signings, speaking events, conferences, un-conferences, art shows, festivals, athletic events, religious events, political events, protests, games, parties, dinners, receptions and poker nights. Correspondingly, digital event material can include a preview, a movie, a digital presentation, a digital book, a digital score, a digital statement, a digital audio file, a digital game or some combination.

Application server 102 is connected to distribution server 120 that manages digital event materials and delivery parameters via connection 128. Connection 128 can be made over a LAN or a WAN network. Of course, distribution server 120 can be located in the same physical location or cluster as application server 102 and thus be in communication with it by a private local connection.

In some embodiments of the invention, distribution server 120 is additionally connected to a physical event venue 130 by a connection 132. The purpose of connection 132 is to deliver digital event materials for event E under the delivery parameters. In FIG. 1 a specific event $E_i$ selected from among those listed above is indicated at venue 130. Furthermore, the fact that connection 132 is optional is indicated in dashed and dotted lines. As will be appreciated by skilled artisans, connection 132 between distribution server 120 and venue 130 can be any suitable wireless or wired connection, including WAN, such as the Internet.

In accordance with the invention, system 100 is designed for generating digital event material and event-based updating of user profiles UP in social network 110A. In the present case, system 100 additionally supports updates to user profiles UP in social networks 110B and 110C. In order to generate digital event material and update user profiles UP based on an given event E, e.g., the particular event $E_i$, several provisions are made in system 100.

First, it is important that viral logic 122 be a mobile executable code snippet or an analogous entity that can be distributed by application server 102, and more precisely its modules 104. Suitable choices include JavaScript version of the Embed Form Code snippet or more advanced code snippets that can be shared and/or embedded with the aid of share buttons, tags and other interactive capabilities. Details on inserting/embedding snippets of various types, including HTML, CSS, Flash and the like is well-known in the art and the reader is also referred to corresponding software reference manuals as well as providers of sharing tools such as ShareThis.com. Further, viral logic 122 is designed to coordinate the interactions between the various parts of system 100 and is thus preferably designed up-front as a cross-platform code snippet.

The functionality of viral logic 122, when delivered to users U in social network 110A, enables one or more groups G of users U to self-organize and to communicate their reactions, feelings and commitment to event E. Specifically, viral logic 122 supports undirected, autopoeitic communications and interactions between users U about event E and/or its delivery parameters.

During viral dissemination of information about event E directed by viral logic 122, users U need to be able to easily share information about event E as well as their commitment to event E. Furthermore, since the digital event material can be a preview for a physical event E, viral logic 122 needs to support viral sharing of at least some digital event material when it includes elements such as a preview. Specific exemplary modalities of viral logic 122 will be described in specific embodiments below.

FIG. 1 illustrates a number of self-organized groups $G_1, \ldots, G_k$ that have self-organized and declared a commitment to event $E_i$. Groups $G_1, \ldots, G_k$ originate from three social networks 110A, 110B and 110C. The actual users U belonging to groups $G_1, \ldots, G_k$ are only indicated schematically by the rounded boxes corresponding to their user environments UE. It should be noted, that more than one group G may self-organize within one social network, as in the presently illustrated case, where more than three groups G have formed in three social networks 110A, 110B, 110C. It should be remarked, that any one self-organized group G may extend over two or more social networks in some embodiments.

Another important provision in system 100 is a rules engine 136 located on distribution server 120. In an alternative embodiment, rules engine 136 can be located on application server 102. Rules engine 136 is designed to evaluate and assess self-organized groups $G_1, \ldots, G_k$. Specifically, engine 136 determines when the commitment of users U reaches a certain threshold or level based on event responses ER of users U.

In the sense of the present invention, measures or indications of the commitment and threshold may take many forms. For example, commitment to see event E at physical venue 130 can be indicated by a first event response ER indicating interest, while the threshold can be indicated by a confirmation of attendance or even on-line purchase of an event ticket. In fact, it is preferred that rules engine 136 have a threshold function for preventing scheduling of digital event material based on at least one auxiliary rule that can include the amount of funding available for event E, size of group G, user profiles UP of users U in group G, geographical location of users U in group G. A number of examples of commitments and thresholds will be described in specific embodiments addressed below.

Still another provision of system 100 required to accomplish its purpose is event-based updating module 104A introduced above. Updating module 104A is designed to re-compile user profiles UP of users U belonging to groups $G_1, \ldots, G_k$ based on event responses ER. FIG. 1 depicts updating module 104A schematically in application server 102. It will be understood, however, that updating module 104A does not need to be confined to physically reside on application server 102.

It is important that in re-compiling user profiles UP, updating module 104A identify a profile change ΔP* in at least one of the profile domains D of user profiles UP of the corresponding users U. Detection of user profile change ΔP* by updating module 104A enables system 100 to identify and propose new communities. Specifically, detection of profile change ΔP* related to event $E_i$, which is denoted as ΔP*→{$E_i$} in relation to exemplary event $E_i$, enables system 100 to identify new communities of users U from among groups $G_1, \ldots, G_k$ based on their event responses ER.

Figure 2:
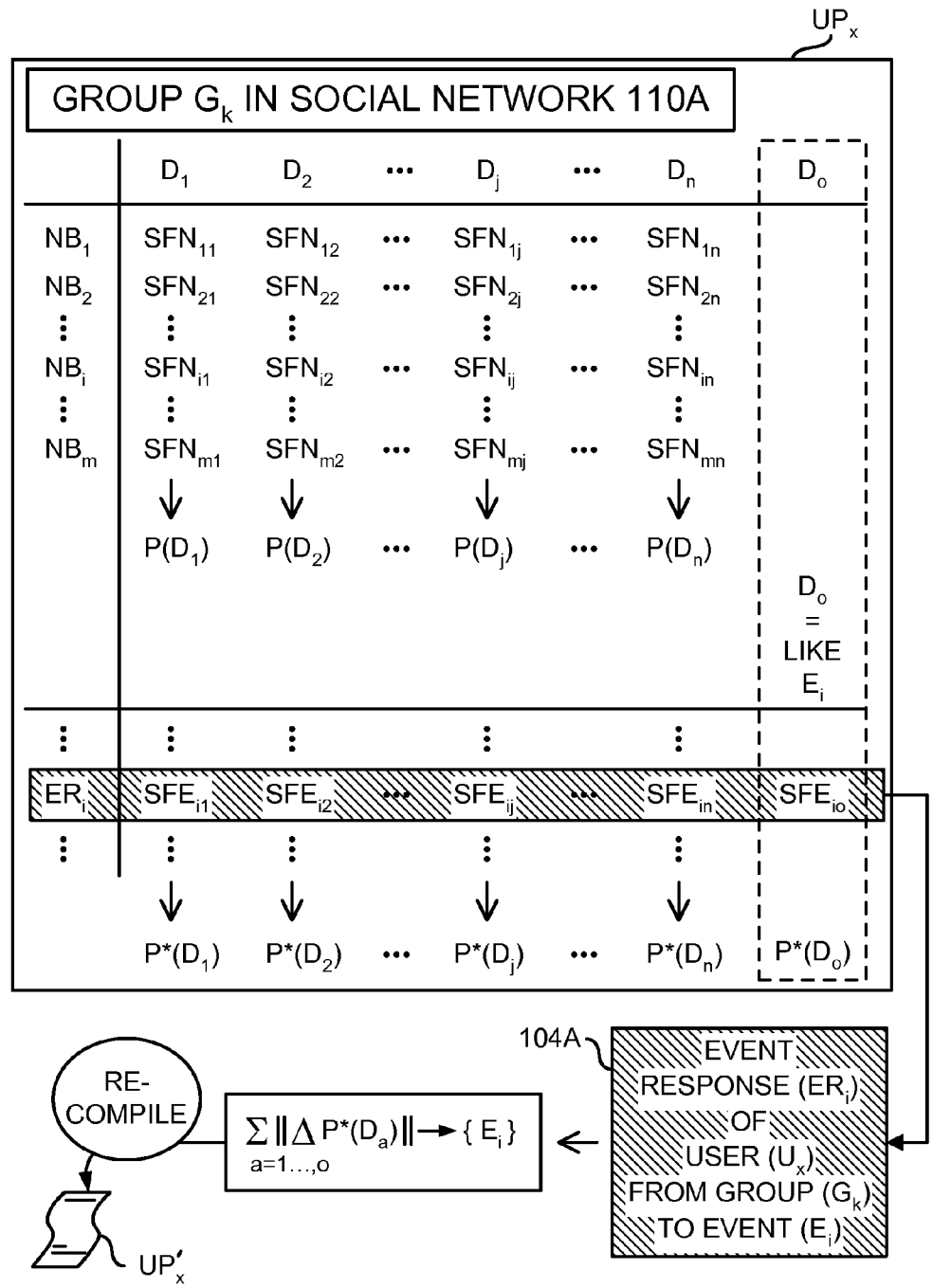
FIG. 2 is a diagram illustrating the operation of an event-based updating module to identify profile changes ΔP* and re-compile a user profile UP.

The diagram in FIG. 2 illustrates how system 100 uses event-based updating module 104A to identify profile change ΔP* in a particular case, namely in user profile $UP_x$ of user $U_x$ belonging to social network 110A. Note that user $U_x$ also belongs to self-organized group $G_k$ that declared a commitment to event $E_i$ and was influenced by event $E_i$.

FIG. 2 shows user profile $UP_x$ in detail, as stored in user profile database 106 in its matrix representation. User $U_x$ of social network 110A performs one or more network behaviors NB, including, without limitation, a customization of a visual graphic, a media preference and a communication preference. Network behaviors NB are observed and stored in user profile database 106. Moreover, network behaviors NB are used to designate the successive rows of the matrix representation of user profile $UP_x$. Conveniently, each specific network behavior NB is designated with a subscript, presently $NB_1, NB_2$ through $NB_m$, and is used to profile user $U_x$.

User profile $UP_x$ is generated with respect to one or more domains D. Domains D are conveniently designated with corresponding subscripts, namely $D_1, D_2, \ldots, D_n$. They define successive columns in the matrix representation of user profile $UP_x$. Domains $D_1, D_2, \ldots, D_n$ can be related to a romantic interaction, a transportation organization, an exercise goal, a fitness goal, a diet regimen, an addiction, a smoking habit, a cause, a community service, a physical activity, an emotional state, a belief, a political affiliation or any combination thereof.

As taught in U.S. Pat. No. 8,156,064 to Brown, a profile P(D) is generated with respect to one or more domains $D_1, D_2, \ldots, D_n$. This is done by a profiling function that associates one or more scale factors SFN for each of the observed network behaviors $NB_1, NB_2$ through $NB_m$. Scale factors SFN are associated based on a relevance of each particular observed network behavior $NB_i$ to a particular domain $D_j$. Thus, the matrix representing user profile $UP_x$ of user $U_x$ is in fact an array of scale factors SFN for domains $D_j$ associated with network behaviors $NB_i$ (or vice versa). A person skilled in the art will recognize that the matrix is transposable and thus the associations can be reversed if desired.

Each of scale factors $SFN_{ij}$ relates the relevance of network behavior $NB_i$, with respect to domain $D_j$. As shown in FIG. 2, user profile $P(D_j)$ with respect to domain $D_j$ is generated based on the scale factors $SFN_{1j}, SFN_{2j}, \ldots, SFN_{mj}$ in the column of domain $D_j$. A network behavior $NB_i$ may be directly relevant, indirectly relevant, partially relevant, or irrelevant to a particular domain $D_j$.

For example, music preferences may be important to profiling and profile matching users U for a carpool, but not relevant to another domain. In contrast, values and ideals may be important to profiling users U to join a cause, but not with matching users for a carpool. In another example, personality types, such as local organizer versus follower, risk taker versus conservative, may be relevant for user profiling in a support group for changing lifestyle and behavior, such as a weight loss or smoking cessation program. Thus, the magnitudes of the scale factors $SFN_{ij}$ represent the relevancy of any specific network behavior $NB_i$ with respect to any particular domain $D_j$. The use of observed network behaviors NB enables profiling and profile matching for any number of domains D without necessarily requiring domain-specific input.

In addition to network behaviors NB, the matrix representation of user profile UP can have additional rows, associated with self-reports of users U. The self-reports can be solicited from users U upon joining social network 110A or over their course of membership. Each self-report, just like each network behavior NB, forms a row that is associated with all domains D by scale factors SF. Rows corresponding to self-reports are not explicitly shown in the matrix, as their treatment and behavior is analogous to network behaviors NB for the purposes of the present invention.

According to the present invention, user profiles UP are expanded beyond prior art teachings, as shown on the example of the matrix representing user profile $UP_x$. Specifically, the expanded matrix representation of user profiles UP of the present invention has additional rows associated with particular events E. More particularly, user profile $UP_x$ shows that the matrix has a specific row $ER_i$ corresponding to the event-response of user $U_x$ to event $E_i$. In other words, row $ER_i$ associates to domains D based on a response of user $U_x$ to a particular, real-world event $E_i$ rather than any self-report or network behavior NB.

It is advantageous to obtain scale factors $SFE_i$ that associate row $ER_i$ with each domain $D_1, D_2, \ldots, D_n$. When available, new profiles $P^*(D_1), P^*(D_2), \ldots, P^*(D_n)$ for each domain $D_1, D_2, \ldots, D_n$ are then computed. Such detailed analysis of user response $ER_i$ to specific event $E_i$ permits very accurate re-compilation of user profile $U_x$. Hence, the determination of any profile change can be very accurate as well.

In the final form, user profile $UP_x$ includes at least profiles $P^*(D)$ obtained from event responses ER. When included in user profile $UP_x$, profiles $P(D)$ without event responses ER can be kept separate from profiles $P^*(D)$ obtained from event responses ER. Profiles $P(D)$ and $P^*(D)$ can be combined in many ways to form complete user profile $UP_x$, as will be appreciated by those skilled in the art. For purposes of a clearer explanation, it will be assumed here that profiles $P^*(D)$ are treated separately to better explain how profile changes $\Delta P^*$ are identified in accordance with the invention.

In practical implementations of system 100, however, scale factors $SFE_i$ may not be known in advance. In some other situations, they may require undue amount of empirical testing and measurements to derive. Performing such in-depth analysis may not be feasible given that a particular event $E_i$ will typically be unique and may not draw a large audience. In other words, there may not be a sufficiently large sample of event responses $ER_i$ to specific event $E_i$ to establish scale factors $SFE_i$ associating event responses $ER_i$ with each domain $D_1, D_2, \ldots, D_n$.

To overcome this practical obstacle, event-based updating module 104A at the very least determines profile change $\Delta P^*$ due to event $E_i$ only. To do this, updating module 104A introduces a new domain $D_o$ associated directly only to event $E_i$ into the matrix representation of user profile $UP_x$. For example, domain $D_o$ can be "Likes Event $E_i$". This is done in order to obtain the most unambiguous scale factor $SFE_{io}$ indicative of how event response $ER_i$ relates to domain $D_o$. In this specific example, scale factor $SFE_{io}$ may assign the highest possible value (e.g., $SFE_{io}=1$) if event response $ER_i$ from user $U_x$ was "liked it", "loved it", "it was excellent" or similar response indicating complete resonance with it. On the other hand, the lowest possible value (e.g., $SFE_{io}=-1$) is assigned if event response $ER_i$ from user $U_x$ was "did not like it", "hated every minute of it", "horrible" or the like. Such response is taken to indicate a state of anti-resonance with event $E_i$. Finally, an intermediate value (e.g., $SFE_{io}=0$) is assigned if event response $ER_i$ from user $U_x$ was "don't remember", "unremarkable", "who cares" or some other indication of no interest or no resonance with event $E_i$.

Since event $E_i$ is usually a one-time affair, it may not be useful to incorporate its corresponding domain $D_o$ into the remainder of the matrix in cases where computing resources are scarce. Of course, given sufficient memory and computing power, domain $D_o$ and its association with all previous network behaviors $NB_1, \ldots, NB_n$ and self-reports via scale factors SFE can be implemented. Indeed, if computable, corresponding scale factors can relate domain $D_o$ with other event responses ER as well. In the absence of sufficient empirical knowledge, the relationships and the corresponding scale factors can be based on educated guesses.

In view of the above, at the very least, profile change $\Delta P^*$ in user profile $UP_x$ of user $U_x$ due to event-response $ER_i$ involves a single scale factor $SFE_{io}$. More precisely, in the simplest embodiment $\Delta P^*=P^*(D_o)=SFE_{io}$. A convenient choice of value range for scaling factor $SFE_{io}$ is from 1 to $-1$, such that $\Delta P^*$ will assume that same value between 1 and $-1$, including 0 for no resonance or irrelevance of event $E_i$ based on user's event response $ER_i$.

Of course, in this simplest exemplary embodiment only one new scale factor, namely $SFE_{io}$ itself, is found in column $D_o$ at row associated with $ER_i$. The remainder of row $ER_i$ is zero in the simple case, since the relationship of the event response $ER_i$ to event $E_i$ and scaling factors $SFE_{i1}$, $SFE_{i2}, \ldots, SFE_{in}$ that would relate event response $ER_i$ to corresponding domains $D_1, D_2, \ldots, D_n$ are not computed or filled in based on educated guesses. The remainder of column $D_o$ is also zero in the simple case.

A person skilled in the art will realize that this simple condition will no longer hold if another event response $ER_p$ or network behavior $NB_q$ (or self-report) turns out to be related to domain $D_o$. Such relationships will be encoded by correspondent scale factors $SFE_{po}$, $SFN_{pq}$.

Preferably, at least a few scale factors $SFE_{ij}$ in row $ER_i$ are known. When such additional scale factors $SFE_{ij}$ are present, then profile change in domains $D_1, \ldots, D_o$ expands into its full form expressed by:

$$\Delta P^* = \sum_{a=1\ldots o} \Delta P^*(D_a) \to \{E_i\}. \quad (\text{Eq. 1A})$$

In this sum, the expression "$\to \{E_i\}$" indicates that the changes in each of the domains $D_1, D_2, \ldots, D_o$ being summed over (also referred to as columns) are related to event $E_i$. It is worthwhile to notice that irrelevance or lack of positive or negative resonance encodes with a value of zero. This is useful, since such encoding of irrelevance ensures that $\Delta P^*$ does not change for users U whose event response $ER_i$ to event $E_i$ indicates irrelevance or lack of resonance.

On the other hand, in some embodiments the positive and negative contributions from resonant (i.e., positive valued) and anti-resonant (i.e., negative valued) scale factors in the domains could cancel out. This may produce a zero for profile change $\Delta P^*$ due to cancellations between positive and negative contributions. For example a small positive $SFE_{io}$ (e.g., $ER_i$ is "kind of liked $E_i$" such that $SFE_{io}=+0.2$) may indicate a large and positive $SFE_{ij}$ (e.g., $SFE_{ij}=+0.8$) and a very large negative $SFE_{i1}$ (e.g., $SFE_{i1}=-1.0$) while the remaining scale factors in the $ER_i$ row remain unchanged (or else unknown or zero). Clearly, in such a case total profile change would be zero (i.e., $\Delta P^*=0.2+0.8-1.0=0.0$), even though the values of three scale factors, namely $SFE_{io}$, $SFE_{ij}$, $SFE_{i1}$ have all changed after user U was influenced by event $E_i$ and provided event response $ER_i$.

To avoid such situations, it is useful to measure the profile change by its norm or absolute value, as follows:

$$\Delta P^* = \sum_{a=1\ldots o} \|\Delta P^*(D_a)\| \to \{E_i\}. \quad (\text{Eq. 1B})$$

By applying Eq. 1B rather than Eq. 1A, we obtain in the above example a profile change $\Delta P^*=2.0$ rather than the misleading zero. When taking a look at the individual scale factors, on the other hand, it is generally most useful to look at their signed values rather than absolute values such that it is immediately apparent whether there is resonance or anti-resonance (i.e., negative resonance). Of course, the other alternative is to not use negative scale factors at all, but to assign values to resonance, anti-resonance and irrelevance in accordance with some other mathematical techniques well known to those skilled in the art.

Now, event-based updating module 104A processes event response $ER_i$ and computes the corresponding profile change $\Delta P^*$, whether it is a simple change involving only scale factor $SFE_{io}$ in column $D_o$, or a more complex change involving additional scale factors $SFE_{ij}$ in any of the other columns $D_1$, $D_2, \ldots, D_n$ that can be computed or guessed based on event response $ER_i$. Updating module 104A then uses profile change $\Delta P^*$ to re-compile user profile $UP_x$. Preferably, re-compiled user profile UP'$_x$, indicated with a prime to differentiate it from the not yet updated user profile UP$_x$, is sent to user profile database 106, as indicated in FIG. 1. Thus, updating module 104A ensures that user profile database 106 contains the most recent, re-compiled user profile UP'$_x$ of user U$_x$ that is event-based.

Figure 3:
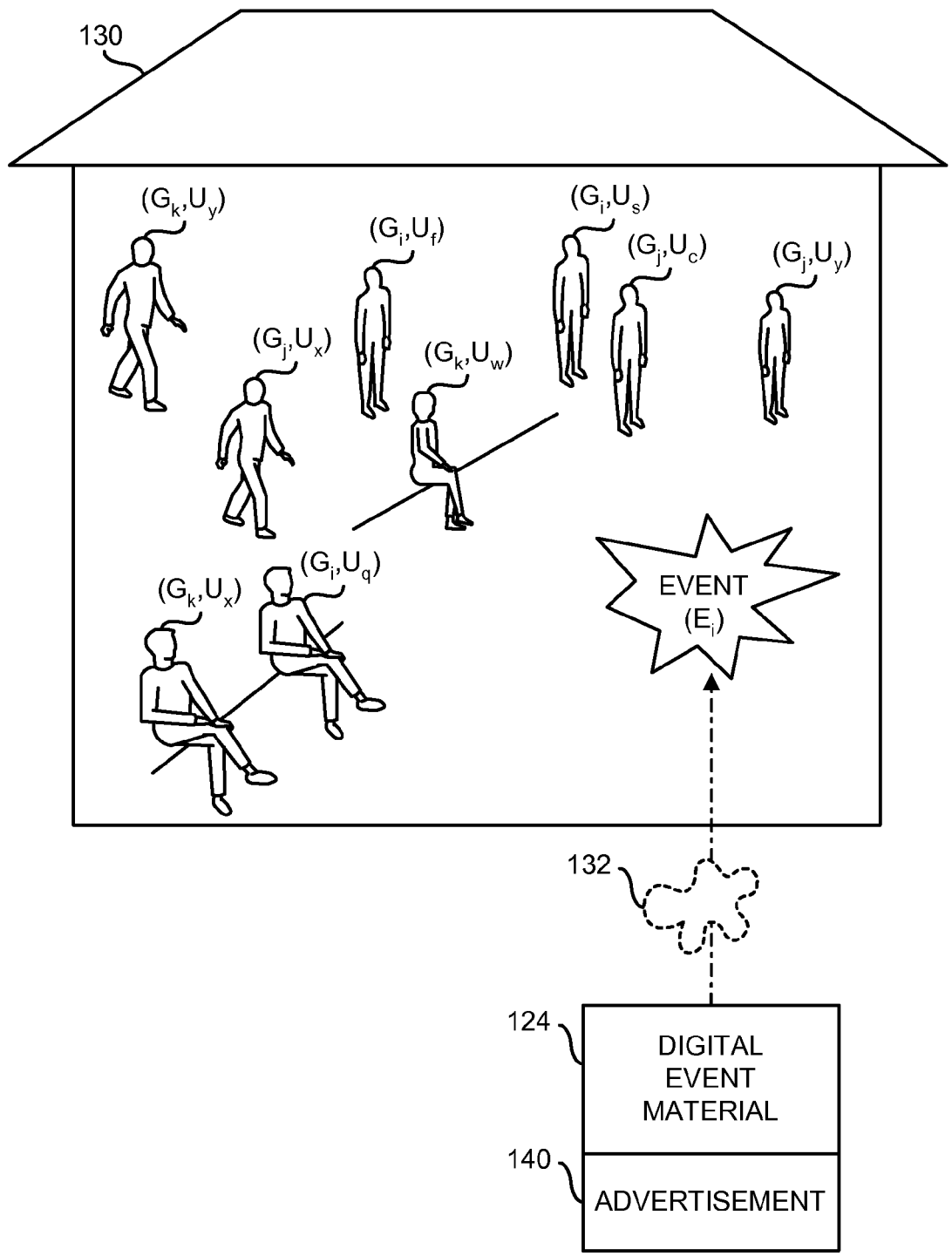
FIG. 3 is a diagram showing users from different groups G attending a particular physical event $E_i$.

Before addressing the formation of a new community based on profile change ΔP*, we turn to FIG. 3 to gain a better understanding of the dynamics associated with events E. FIG. 3 depicts users U belonging to three different groups G$_i$, G$_j$, G$_k$ (see FIG. 1) attend physical event E$_i$. All users U are assembled at physical venue 130, which in the present case is a building hosting the performance of event E$_i$. For more transparency, we introduce the notation (G, U) for each user U, such that he/she is identified first by his/her group G and then by assignment within group G. Thus, user U$_x$ of group G$_k$, whom we have been examining thus far, is referenced as (G$_k$, U$_x$).

Digital event material 124 is delivered to venue 130 either through system 100 via connection 132 or independently thereof. Since user profiles UP for users U of all groups G in attendance are known prior to event E$_i$, additional information, such as an advertisement 140 in the present example, can be added to or integrated with digital event material 124. Such advantageous integration of advertisement 140 with digital event material 124 is implemented by viral logic 122 based on user profiles UP of users U belonging to group G.

Figure 4:
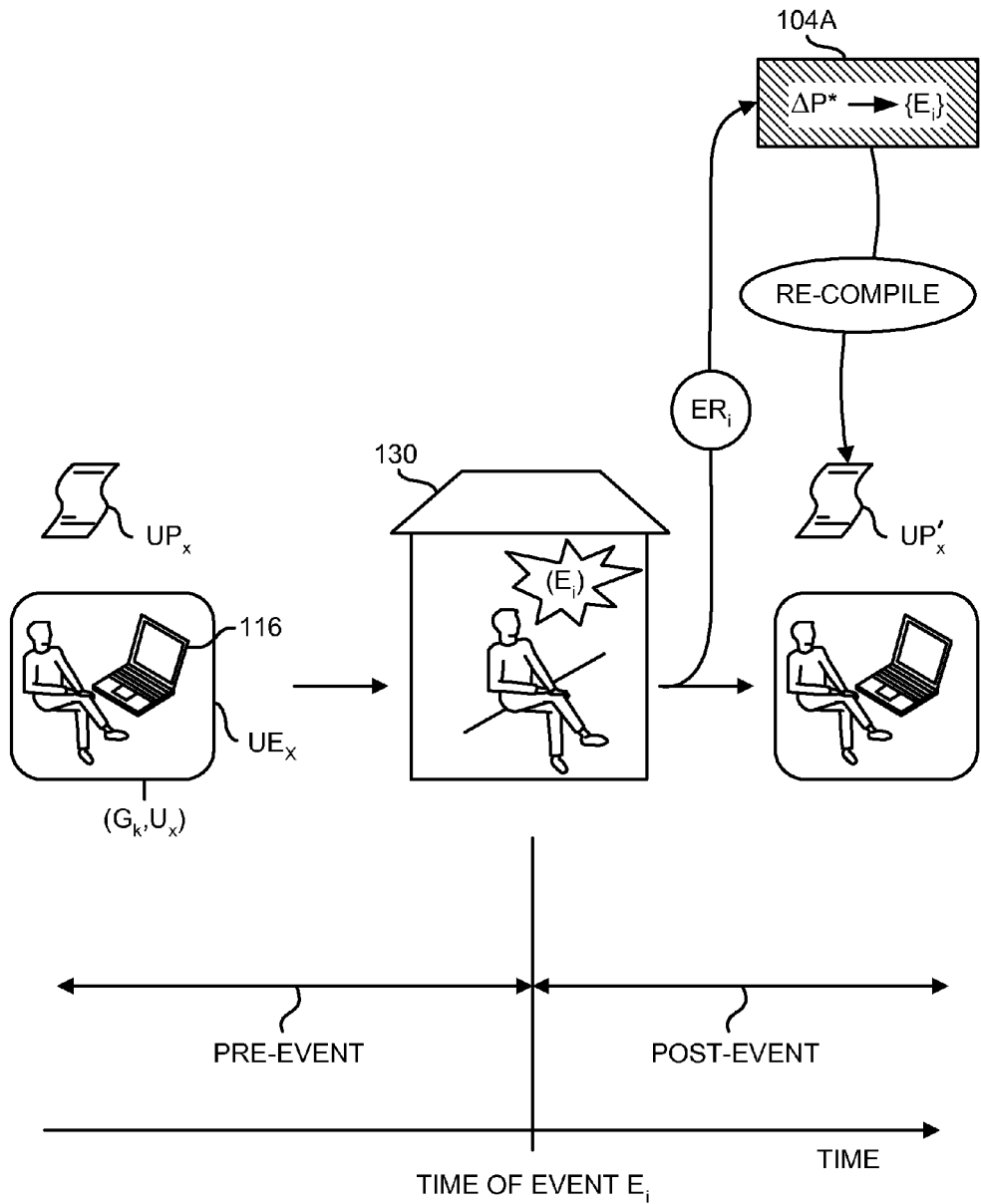
FIG. 4 is a diagram illustrating pre- and post-event experiences and actions of a particular user.

We now refer to FIG. 4, which depicts in more detail the experience and actions of user (G$_k$, U$_x$) pre- and post-event. Before or pre-event, user (G$_k$, U$_x$) resides in his user environment UE$_x$. He gains access to application server 102 and logs into social network 110A using his network device 116, which in the present case is his laptop. With the aid of viral logic 122, user (G$_k$, U$_x$) joins self-organized group G$_k$ prior to event E$_i$. At this time, user profile UP$_x$ of user (G$_k$, U$_x$) is still unaltered by event E$_i$, although his commitment to event E$_i$ can be used in selecting advertisement 140 (see FIG. 3) to accompany digital event material 124.

At the time of event E$_i$, user (G$_k$, U$_x$) is present at venue 130 and experiences event E$_i$ along with other attendees. Note that besides users U belonging to groups G$_i$, G$_j$, G$_k$ there may be attendees who came to event E$_i$ without any social network intermediation. Attendees not in groups G$_i$, G$_j$, G$_k$ are not indicated in FIG. 3 for reasons of clarity.

Post-event, or even during event E$_i$, user (G$_k$, U$_x$) will have one or even multiple responses ER$_i$ to event E$_i$. These are event responses ER$_i$ already mentioned above and they are used in updating user profile UP$_x$. It should be noted that they could range from resonating with event E$_i$ (e.g., agreeing with its presentation of issues, finding an emotional connection with the contents, etc.) to anti-resonating with event E$_i$ (e.g., being repulsed by it, finding it emotionally disturbing, etc.) to not resonating with it at all, i.e., finding it irrelevant. Another way to understand the last condition, is that users finding event E$_i$ irrelevant are unaffected by event E$_i$ in either positive or negative ways.

For the convenience of user (G$_k$, U$_x$), the one or more event responses ER$_i$ he has can be formatted to be smartphone notifications, e-mails, phone calls and SMS messages. Thus, user (G$_k$, U$_x$) can communicate his event response(s) ER$_i$ to event-based updating module 104A while still at venue 130 or later with any appropriate mobile network device supporting the corresponding format.

Furthermore, also for user convenience, updating module 104A is configured to receive event responses ER$_i$ in a format such as a rating, a structured response or even an unstructured response. A rating may be a simple "thumbs up" or "thumbs down" grade. A structured response may include answers to specific questions. An unstructured response may be an ad lib response of user U in an SMS message. Those familiar with the art will realize that there is a multitude of options for implementing responses with ratings, structure or no structure.

Once received by updating module 104A, event response ER$_i$ allows a re-compiling of user profile UP$_x$ in accordance with the rules presented above. In order to differentiate pre-event user profile UP$_x$ from its post-event condition, post-event user profile UP'$_x$ is denoted with a prime. It is very important to note that event response ER$_i$ can include feedback and ratings related not only to event E$_i$ itself, but also to the overall experience and/or interactions with other attendees. Furthermore, note that remaining attendees who are also users U and members of groups G$_i$, G$_j$, G$_k$ can respond in a similar fashion as user (G$_k$, U$_x$). Thus, a number of event responses ER$_i$ for those other users U will be collected by updating module 104A in response to event E$_i$.

Figure 5:
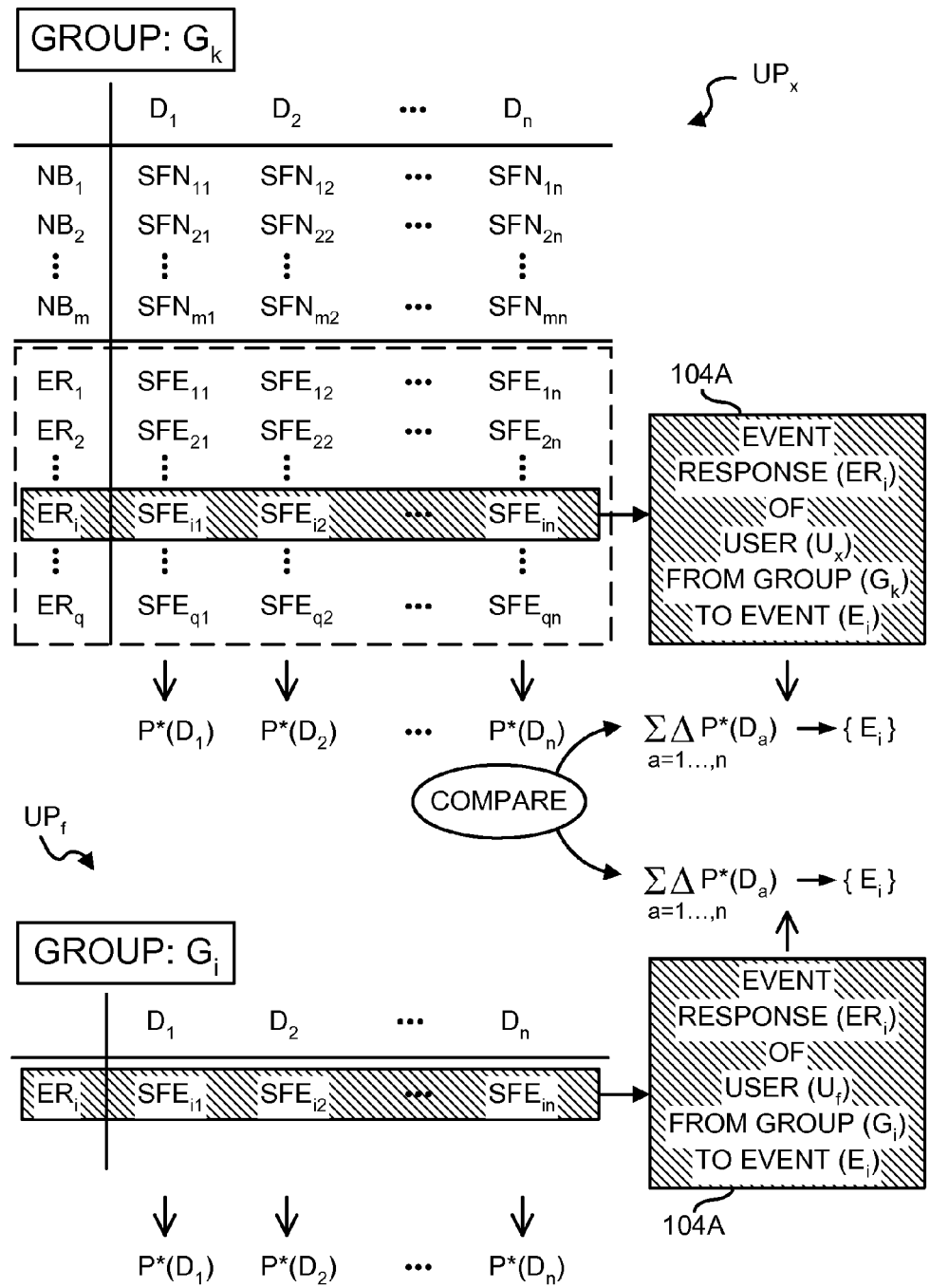
FIG. 5 is a diagram showing some fundamental aspects of new community formation.

We now turn to the diagram of FIG. 5 to examine how updating module 104A compares profile changes ΔP* and enables the formation of a new community from users U of groups G$_i$, G$_j$, G$_k$ that attended event E$_i$ in a very simple case. Notice that in this particular embodiment, no new column D$_o$ is assigned to tabulate event responses ER$_i$. Rather, event responses ER$_i$ are related to already existing domains D$_1$, D$_2$, ... D$_n$ by known scale factors SFE$_{i1}$, SFE$_{i2}$, ..., SFE$_{in}$. Consequently, profile change ΔP* in this embodiment is based only on changes in profile for already defined domains D$_1$, D$_2$, ... D$_n$. Profile change ΔP* can thus be expressed as:

$$\Delta P^* = \sum_{a=1...n} \Delta P^*(D_a) \to \{E_i\}, \quad \text{(Eq. 1C)}$$

where the summation terminates at n rather than o, as in the example of FIG. 2 and the norm (see Eq. 1B) should be used if necessary to avoid the cancellation of positive and negative valued contributions when computing total profile change ΔP*. Note that profile change due to scale factor SFE$_{io}$ in new column D$_o$ specifically associated with event E$_i$ could be computed separately or together with the other columns D$_1$, D$_2$, ..., D$_n$ in another embodiment.

Individual event responses ER$_i$ of user (G$_k$, U$_x$) and of user (G$_i$, U$_f$) shown in FIG. 5 are indicated passing to updating module 104A represented in two separate blocks. This is done to better show how updating module 104A compares profile changes ΔP*. Specifically, updating module 104A applies a resonance condition to profile changes ΔP*. In the simplest implementation of resonance testing, profile changes ΔP* of users (G$_k$, U$_x$) and (G$_i$, U$_f$) are compared by the matching condition to identify compatibility in one or more of the already defined domains D$_1$, D$_2$, ... D$_n$. In other words, after profile changes ΔP* of users (G$_k$, U$_x$) and (G$_i$, U$_f$) are computed, profiles P*(D) related to a specific domain, e.g., domain D$_2$ match. The actual matching of the profiles P*(D) in any specific domain P*(D$_j$) should now be done without the application of absolute values (norms). That is because at this point the resonance condition applied by updating module 104A is no longer trying to determine the profile change ΔP* but its actual value. That is because updating module 104A is now determining whether there is resonance (i.e., the sign of the corresponding scale factors is the same) or anti-resonance (i.e., the sign of the corresponding scale factors is different) between users (G$_k$, U$_x$) and (G$_i$, U$_f$) in the particular domain D$_j$.

For example, scale factors $SFE_{i2}$ associating event responses $ER_i$ for domain $D_2$ for both user $(G_k, U_x)$ and user $(G_l, U_f)$ change in the same way or even assume the same positive or negative value. Due to this relation, updating module 104A can match user $(G_k, U_x)$ and user $(G_l, U_f)$ with respect to domain $D_2$.

In fact, resonance between users $(G_k, U_x)$ and $(G_l, U_f)$ can be found in more than one of domains $D_1, D_2, \ldots D_n$. Once again, note that in this case the resonance is observed in previously defined domains $D_1, D_2 \ldots D_n$, rather than in new domain $D_o$ defining a new column specific to event $E_i$. As remarked above, resonance in new domain $D_o$ can also be computed by updating module 104A and included in resonance testing. Further information about profile matching methods the reader is referred to U.S. Pat. No. 8,156,064 to Brown, which is incorporated herein by reference.

Figure 6:
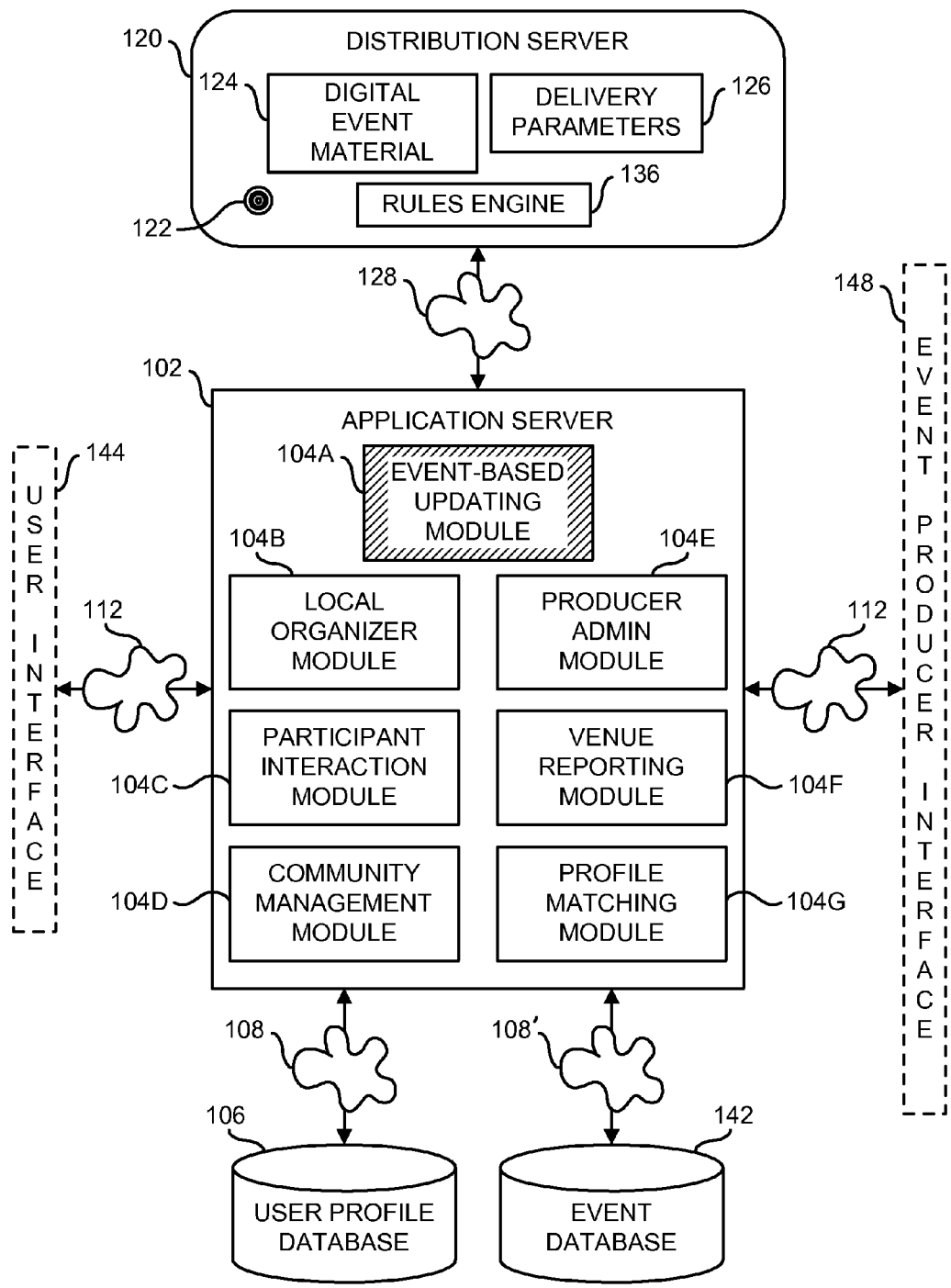
FIG. 6 is a diagram illustrating in more detail a preferred implementation of a system according to the invention.
Figure 7A:
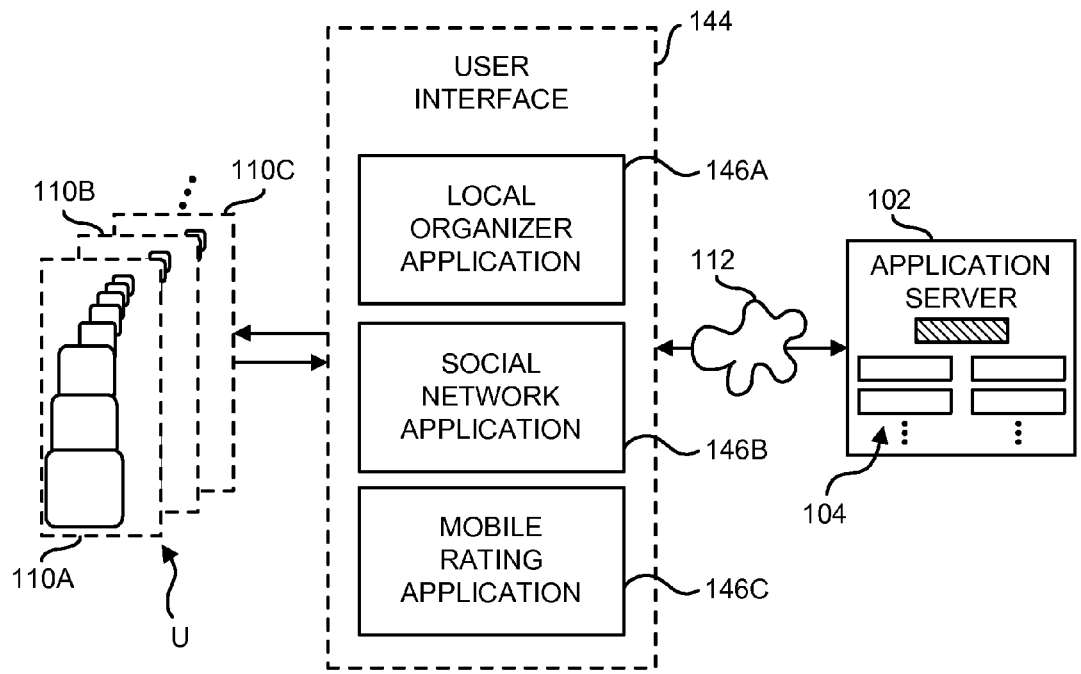
FIG. 7A shows a diagram of the user interface deployed by the system of FIG. 6.
Figure 7B:
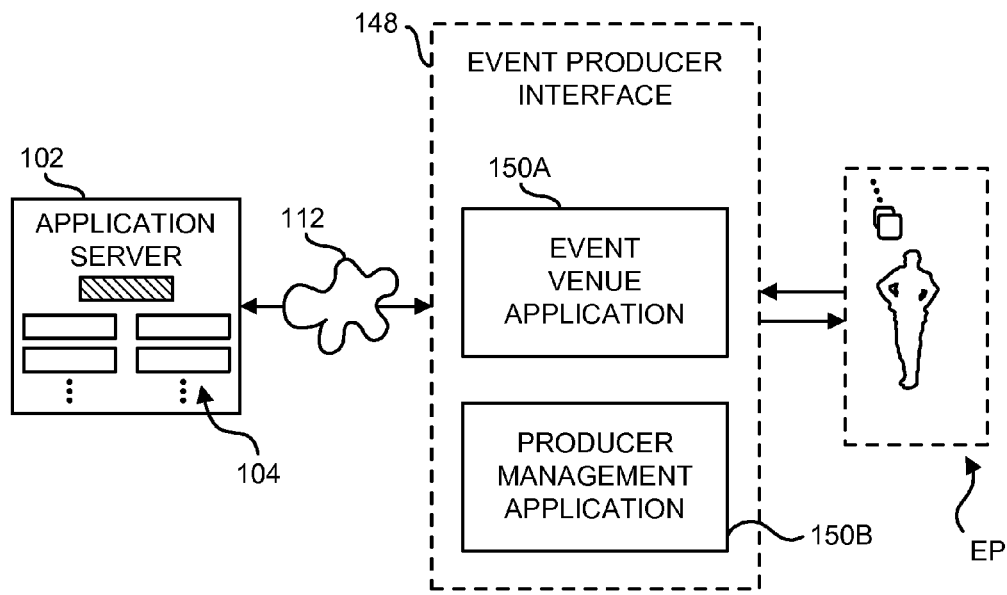
FIG. 7B shows a diagram of the event producer interface deployed by the system of FIG. 6.

To explain more precisely how updating module 104A of application server 102 updates user profiles UP and how resonance matching is implemented in specific cases, we now turn to the diagrams of FIG. 6 and FIGS. 7A-B. Note that the same reference numbers as previously employed are re-used in these drawing figures to call out corresponding parts.

FIG. 6 shows application server 102 in a preferred embodiment, where it is equipped with a number of support modules 104, in addition to event-based updating module 104A. Support modules 104 include a local organizer module 104B, a participant interaction module 104C and a community management module 104D. Modules 104 also include a producer administration module 104E, a venue reporting module 104F and a profile matching module 104G. In the preferred embodiment, updating module 104A works in cooperation with modules 104B-G to implement the method of invention. Viral logic 122 is aware of all support modules 104 and coordinates between them.

Distribution server 120 is connected to application server 102 via connection 128. Digital event material 124, as well as delivery parameters 126 for material 124 are indicated explicitly. In addition, rather than having a direct connection to a physical event venue (as shown in FIG. 1), in this preferred embodiment distribution server 120 cooperates with modules 104 on application server 102 to execute its functions and accesses resources via server 102.

User profile database 106 is connected to application server 102 by connection 108, as in the previous embodiment. In addition, an event database 142 is connected to application server 102 via connection 108'. Connection 108' can be the same as connection 108, or it can be a different connection if user profile database 106 and event database 142 are not collocated. It should be noted that distribution server 120 has access to event database 142 via application server 102 in this embodiment. It is also possible to provide a direct connection between event database 142 and distribution server 120 in alternative embodiments.

Application server 102 interacts with users U in social networks 110A-C via a user interface 144. User interface 144 is shown on the down-link side of connection 112, i.e., on the side of users U. It is understood, however, that user interface 144 has portions resident on the side of application server 102 or on the up-link, as well as on the side of users U or on the down-link.

FIG. 7A illustrates user interface 144 in more detail. Specifically, user interface 144 has a number of interface applications 146. These include a local organizer application 146A for a user U who takes on the role of group organizer. There is a social network application 146B for interfacing with the actual social network servers supporting social networks 110A, 110B, 110C. Also, there is a mobile rating application 146C for managing queries to users U and event responses ER from users U. Viral logic 122 is aware of interface applications 146 and coordinates between them.

Returning to FIG. 6, we see that application server 102 has an event producer interface 148. Interface 148 is shown on the down-link side of connection 112 in this preferred embodiment. Again, it is understood, that interface 148 has portions resident on the side of application server 102 or on the up-link, as well as on the side of event producer.

FIG. 7B illustrates event producer interface 148 in more detail. Interface 148 has two interface applications 150A, 150B. Interface application 150A is an event venue application that allows one or more event producers EP to manage the venue for event E. Interface application 150B is a producer management application that allows one or more event producers EP to manage the production and other aspects of creating event E, including overseeing the financial aspects of the production of event E. Viral logic 122 is aware of interface applications 150 and coordinates between them.

A detailed description of the preferred method of invention will now be given for the case of a specific event E. Of course, event E can in general include film screenings, concerts, book signings, speaking events, conferences, un-conferences, art shows, festivals, athletic events, religious events, political events, protests, games, parties, dinners, receptions and poker nights. Correspondingly, digital event material 124 can include a preview, a movie, a digital presentation, a digital book, a digital score, a digital statement, a digital audio file, a digital game and any combination thereof.

In the present example, event E is a screening of a film or movie $E_i$. In this case, digital event material 124 is a preview of movie $E_i$. Applicable delivery parameters 126 of movie $E_i$ include venue location, show times, seating and theatre capacities, as well as ticket pricing and other movie-specific information. Both, digital event material 124 and delivery parameters 126 are provided to at least one of users U.

As shown in FIG. 8A, user $U_y$ of social network 110A receives material 124 and parameters 126 in his user environment $UE_y$, and on his network device 118A, which is a smart phone. This step is performed by distribution server 120 with the aid and coordination of viral logic 122. More precisely, material 124 and parameters 126 are directed by viral logic 122 to user $U_y$ as a potential local organizer. The transmission is via connection 128 to application server 102, which then routes them via local organizer module 104B to local organizer application 146A of user interface 144 to the recipient, i.e., user $U_y$.

It should be noted that in an alternative embodiment, participant interaction module 104C could substitute for local organizer module 104B. This can be done when viral logic 122 has no prior information on any of users U of social network 110A and hence cannot decide a priori on any particular candidates for local organizers. In fact, participant interaction module 104C could even forward material 124 and parameters 126 to all users U in social network 110A if no candidates for local organizers are known. Additionally, participant interaction module 104C can provide a local organizer function to support at least one local organizer of group G chosen among corresponding users U.

Preferably, however, separate local organizer module 104B and local organizer application 146A are deployed to support one or more local organizers among users U. To incentivize the one or more local organizers, local organizer module 104B can support a direction connection between them and rules engine 136 (see FIG. 6) for privileged communications. Rules engine 136 can contain financial and/or other incentives pre-set by sponsors, producers, directors, hosts and other parties involved in event E for such local organizers.

Local organizer application 146A is a part of user interface 144 and it runs on any network device. The purpose of organizer application 146A is to help viral logic 122 in promoting the self-organization of at least one group G from among users U around movie $E_i$. In addition, organizer application 146A is designed to aid in the communication of commitments of users U to attending at the screening of movie $E_i$. Clearly, there are many ways in which organizer application 146A can be structured.

A preferred embodiment of organizer application 146A is shown in FIG. 8B. Here, user $U_y$ is deploying his other network device 118B, which is a tablet computer, to run application 146A. Application 146A preferably allows user $U_y$ to login and create an account. In fact, this is the preferred way for user $U_y$ to indicate his or her availability as local organizer to viral logic 122. The login and account creation can be performed, for example, with Facebook connect by permitting organizer application 146A to access user's $U_y$ Facebook identification and profile information.

In FIG. 8B, user $U_y$ is shown already logged into organizer application 146A and material 124, which is the preview related to the screening of the corresponding movie $E_i$, is already on the screen of user's network device 118B. Preview 124 is available for viewing by user $U_y$. Furthermore, a banner ad 152 is included along with preview 124. Banner ad 152 represents advantageous pre-event advertising. In an alternative embodiment, such advertising can be embedded in preview 124.

Parameters 126 are also shown on the screen. These include the name of the film or movie, the name of the local organizer i.e., user $U_y$, as well as various additional pieces of information shown in the bottom half of the display screen. User $U_y$, as local organizer, can select the exact type of information to be shown and which information should be shared with any other users U that he or she wants to invite to movie screening $E_i$.

It should be noted, that organizer application 146A can include information about many events E, not just the showing of movie $E_i$ discussed here by way of example. Thus, user $U_y$ can normally select from many available events E and organize a group of participating users U for any one or more events E. This includes tentative seat reservations and sending of invitations to friends among users U. In fact, in a preferred embodiment, application server supports block reservation, ticket allocation monitoring, dissemination of ticket allocation information and event feedback collection.

FIG. 9A shows how local organizer $U_y$ sends out invitation to movie screening $E_i$ with the aid of organizer application 146A of user interface 144 to one of his friends, namely to user $U_x$. Invitation passes back through connection 112 to application server 102 and is routed again via connection 112 by participant interaction module 104C to social network application 146B of user interface 144.

Social network application 146B is preferably Facebook, but it can be any other social network application such as Google+, LinkedIn, or Twitter where users U have a profile and a list of friends or connections. Social network application 146B serves primarily as a source of profile information and as a distribution channel for communications to potential participants or attendees of movie screening $E_i$. Social network application 146B can also be the host of a community through a user group functionality.

User $U_x$ receives invitation from user $U_y$, acting as local organizer, on his network device 116, which is a laptop computer. Laptop computer 116 is running social network application 146B. Viral logic 122, operating in the background, is aware of the sending of the invitation from organizer $U_y$ to friend $U_x$. Preferably, viral logic 122 logs the invitation to track the process of group self-organization.

In FIG. 9B user $U_x$ is shown already running social network application 146B and we also see the screen that is displayed by application 146B on his laptop computer 116. In this example, user $U_y$ has sent all the same information in his invitation to user $U_x$ as was present on his own screen in organizer application 146A. In particular, preview 124, parameters 126 and banner ad 152 are all present for invited user $U_x$ to see on the screen of laptop computer 116 running social network application 146B. In general, however, user $U_y$ can, as local organizer and in his discretion, limit the amount and type of information shown to invited user $U_x$.

In accordance with the invention, a commitment to seeing movie $E_i$ can be indicated by invited user $U_x$ within social network application 146B. Fields are provided to indicate a desire to attend in the "Want to join?" section of parameters 126. In fact, commitment can even include a rating of upcoming movie screening $E_i$ based on user's $U_x$ perception of preview 124. Once again, viral logic 122 preferably logs the indicated commitment to seeing movie $E_i$ by invited user $U_x$.

In some cases invited user $U_x$ may have already seen the movie at some other screening. He can thus provide an event response $ER_i$ to movie screening $E_i$. Such event response $ER_i$ can be shared with the aid of viral logic 122 with other users U either directly, or via organizer $U_y$, depending on the specific embodiment.

Of course, user $U_y$ as well as any other local organizer(s) will have sent invitations to many users U of social network 110A, besides user $U_x$. The indications of commitment to seeing movie $E_i$ as well as any event responses $ER_i$ gathered from invited users U represent information that supports the self-organization of one or more groups G with commitment to attend movie screening $ER_i$. To track the process of this autopoeitic formation of groups G, viral logic 122 preferably logs indications of commitment and event responses $ER_i$ in a timely manner and as they become available (as close to real-time as possible).

In general, it is advantageous for viral logic 122 to support the sharing of commitments and event responses ER with users U on their network devices. Such sharing can further promote autopoeitic formation of groups G, i.e., groups of users U with declared commitment to attend movie screening $E_i$. Clearly, users U with whom commitments and event responses ER are shared are most preferably users U outside groups G of users U that have already indicated some level of commitment to seeing movie $E_i$. These additional users U, once contacted, can decide to join one of the self-organizing groups G to thus augment it. This increases the number of prospective attendees at movie screening $E_i$.

For user convenience, commitments as well as event responses ER can be formatted to be smartphone notifications, e-mails, phone calls and SMS messages. Furthermore, event-based updating module 104A is configured to receive event responses ER in a format such as a rating, a structured response or even an unstructured response. Commitments can be received in any suitable format, including a simple numerical count, as shown among parameters 126 depicted on the screen of user device 116 of user $U_x$ in FIG. 9B. In addition, users U can communicate their commitments or responses with the aid of any suitable social network tools. For example, media content tagging can be deployed by users U. A suitable method of media content tagging on a social network is taught in U.S. Published Application 2009/0150786 to Brown.

To facilitate in the planning and putting on of events E, viral logic 122 can implement booking for movie screening $E_i$ among users U belonging to group G of users U that were invited by local organizer. For this purpose, the status of reservations to movie screening $E_i$ is also included among parameters 126 and shared among users U of group G. This advantageous aspect of the invention is also shown in FIG. 9B.

Preferably, it is participant interaction module 104C that supports interactions among users U via their network devices in combination with social network application 146B. Thus, module 104C and application 146B jointly implement booking and reservation status sharing under the supervision of viral logic 122. For example, viral logic 122 enables participant interaction module 104C to allow social network application 146B to share this information among users U of group G directly or via local organizer $U_y$. Since participant interaction module 104C supports logging users U into social network 110A and interacting, this information can be shared as an external alert or notification delivered to the users' U network devices. The information can be shared during a regular session, immediately upon login or even outside a logged in session, depending on level of urgency or as dictated by viral logic 122.

To better understand the operation of the preferred embodiment in relation to event producers EP and other parties involved in producing and putting on event $E_i$, we turn to the diagram of FIG. 10. This drawing figure shows event producers EP, as well as directors, hosts and other parties generally indicated by ES connected to application servers 102 via event producer interface 148 and connection 112. Note that some of the parties may overlap. For example, specific party $EPS_i$ is both a producer and a host.

An event producer EP connects with distribution server 120 via application server 102 and connection 128. As event producer EP, the particular person can access rules engine 136 as well as digital event material 124. The interaction is supported by producer management application 150B in conjunction with producer administration module 104E (see FIG. 6). The actual interaction can take advantage of any suitable device, including network devices (not shown). Once again, viral logic 122 is aware of this interaction.

Once connected to distribution server 120, event producer EP accesses rules engine 136 to specify certain parameters governing events E that they are producing. For example, in the case of movie screening $E_i$, event producer EP can access rules engine 136 to specify the conditions under which movie screening $E_i$ can take place. In general, these conditions can include any stipulations. Preferably, however, the conditions include a threshold function such as the selling of a certain number of tickets or declaration of commitment to see movie screening $E_i$ by a sufficient number of users U.

Preferably, the threshold function prevents scheduling of physical event E such as movie screening $E_i$ at physical event venue 130 unless at least one condition indicated by event producer EP is satisfied. The condition can include one or more metrics and corresponding minimum values. Some exemplary conditions include: an amount of funding required to put on movie screening $E_i$, a size of group G of users U that have expressed commitment by a certain time, user profiles UP of users U belonging to group G, a geographical location of users U belonging to group G. Of course, any metric that event producer EP deems important in making a commitment to movie screening $E_i$ can be set in rules engine 136 by event producer EP.

In certain embodiments, the method of invention can be used to help event producer EP to not only ascertain commitment of users U in groups G to attending movie screening $E_i$, but also to raise funds. The funds are project-based or event-based, i.e., based on work required to put on movie screening $E_i$. Such work can involve the filming of the movie itself as well as other activities associated with finishing, distributing and screening of the movie. The reader is referred to U.S. Published Application 2009/0112611 to Brown for teachings about appropriate infrastructure to implement interactive fundraising in combination with the method and system of the present invention.

In the preferred embodiment, rules engine 136 allows event producer EP to set financial and/or other incentives for local organizers. For example, in the case of local organizer $U_y$ described above, a post-event payment amount can be specified by event producer EP and stored in rules engine 136. Viral logic 122 in charge of overall system can communicate the payment amount to local organizer $U_y$ upfront to ensure their dedication in recruiting users U to join group G.

Similarly event sponsors ES, such as directors, hosts and other involved parties or stakeholders, can store their requirements for putting on movie screening $E_i$ in rules engine 136. In particular, event venue application 150A in conjunction with venue reporting module 104F (see FIG. 6), permit event hosts to set rules for making their physical venue 130 available for movie screening $E_i$. Once stored in rules engine 136, the rules are reflected in delivery parameters 126. For example, the rules can specify the size of venue 130 available for movie screening $E_i$, show times and seating options for users U belonging to group G. Additional targeted promotional items can be included in such rules.

As mentioned above, the parameters 126 are disseminated with the aid of viral logic 122 to ensure that local organizer $U_y$, as well as any users U joining group G are aware of parameters 126 under which movie screening $E_i$ can take place. Of course, any incentives, conditions, rules and other pertinent parameters 126 can be changed dynamically by event producers EP and event sponsors ES. For example, event producers and sponsors EP, ES can adjust incentives, conditions, rules and any other information belonging to parameters 126 after viewing commitments and event responses ER of users U pre-event.

Rules engine 136 of distribution server 120 determines when the commitment reaches a certain threshold by reviewing event responses ER from users U. In situations where one or more important conditions, such as a threshold number of users U in all groups G committed to attending movie screening $E_i$ is not met, the threshold function can authorize rules engine 136 to automatically cancel movie screening $E_i$. Similarly, when the threshold is set based on user profiles UP of users U belonging to group G or geographical location of those users U rules engine 136 can also cancel movie screening $E_i$.

Typically, the thresholds are set in advance to avoid an economically infeasible situation for event producers and sponsors EP, ES. However, ultimate decision-making authority can be placed in the hands of event producers and sponsors EP, ES who can suspend rule engine 136 and make the ultimate decision about movie screening $E_i$. In some embodiments, e.g., when venue 130 is a multi-screen theater, event venue application 150A preferably allows event sponsors EP (and especially theatre owners) to change a screening location or room depending on demand among users U. This function can either be entered through application 150A as a rule into rule engine 136, or adjusted right before the screening.

It should be noted, that commitments by users U of group G to attend movie screening $E_i$ can be treated as event responses $ER_i$ to compute updated profiles and test for resonance in accordance with the method of invention. Similarly, responses to preview 124 can be treated as event responses $ER_i$ to update user profiles UP and test for resonance. In this case, the viewing by users U of preview 124 is itself treated as an event E. Based on duly re-compiled user profiles UP, selection of advertisement 140 (see FIG. 3) can be adjusted. Similarly, delivery parameters 126 as well as venue 130 can be changed to accommodate the dynamic changes of user profiles UP belonging to users U in group G.

Preferably, however, event responses $ER_i$ to actual movie screening $E_i$ are used by event-based updating module 104A to execute its function of discovering new communities among users U in group G. In particular, a new community is formed from a subgroup SG of the one or more groups G based on event responses $ER_i$ received from users U.

To understand event-based formation of a new community based on the example of movie screening $E_i$ we turn to the diagram of FIG. 11. The latter depicts a pool of attendees AP present at movie screening $E_i$. Attendees AP include non-affiliated attendees NA who are not members of any social network, as well as users U belonging to social networks 110A, 110B and 110C. We are interested in users U belonging to social networks 110A, 110B, 110C who have joined at least one self-organized group G by declaring commitments to attending movie screening $E_i$. Furthermore, among users U in groups G, we focus on those actually attending movie screening $E_i$.

FIG. 11 specifically calls out some users U from groups $G_i$, $G_j$ and $G_k$ (see FIG. 1) that are in attendance. Users $U_p$, $U_q$, and $U_s$ of group $G_i$ are present, as well as users $U_o$, $U_x$, $U_y$ from group $G_j$ and users $U_w$, $U_x$, $U_y$ from group $G_k$. Remaining users U are not specifically called out, but are included within dashed ellipses designating groups $G_i$, $G_j$, $G_k$ as subsets of the set constituted by pool of attendees AP.

During or post-event, users U of groups $G_i$, $G_j$, $G_k$ react to their experience of movie screening $E_i$. Using their network devices (not shown in this drawing figure) they submit their event responses $ER_i$ in any of the above-discussed formats to event-based updating module 104A. The latter receives event responses $ER_i$ and re-compiles user profiles UP based on discerned profile changes $\Delta P^*$ that are due to the experience of movie screening $E_i$ by corresponding users U. Persons skilled in the art will realize that any additional filtering techniques to ensure that event responses $ER_i$ are indeed in response to movie screening $E_i$ may be deployed by updating module 104A to avoid recording incorrect profile changes $\Delta P^*$.

Updated user profiles UP' are sent by updating module 104A to be stored in user profile database 106. Meanwhile, profile changes $\Delta P^*$ due to movie screening $E_i$, i.e., $\Delta P^* \to (E_i)$, of corresponding users U are sent to profile matching module 104G. Note that in an alternative embodiment module 104G can have a direct connection to user profile database 106. In any case, module 104 maintains contact with user profile database 106 and can also assume some typical tasks associated with its maintenance.

Profile matching module 104G preferably has many functional capabilities. For example, it can retrieve user preferences, interests, behaviors and friend data from the user's U social network 110. It can also receive preference data from other linked services (i.e., purchase history from e-commerce or media purchasing sites). Most importantly, profile matching module 104G adjusts scale factors SFN, SFE that associate network behaviors NB and event behaviors ER with profile domains D. In other words, module 104G dynamically monitors how network behaviors NB and event behaviors ER correlate with chosen domains D in user profiles UP and updates user profiles UP correspondingly. For a complete description of scale factor adjustments the reader is again referred to U.S. Pat. No. 8,156,064 to Brown.

Community management module 104D maintains a list of subgroups SG of users U that attended event E and resonated with it. In other words, module 104D maintains the results obtained from applying the method of invention for event-based community formation. In the specific example, module 104D is connected to profile matching module 104G to receive profile changes $\Delta P^*$ of users U in groups G due to experience of event E based on the most up-to-date scale factors ascertained by module 104G.

The key aspects of operation of profile matching module 104G and community management module 104D are explained with further reference to FIG. 12. This figure presents a diagram of a preferred method of resonance testing for event-based new community formation. All groups G are shown undergoing the resonance test. The resonance test is based on event responses $ER_i$ to movie screening $E_i$, during which digital event materials 126, in this case a digital file of the movie, as well as advertisement 140 caused users in groups G to undergo profile-changing experiences. For clarity, only users U already explicitly identified in the diagram of FIG. 11 are called out in groups G.

The actual resonance test of comparing profile changes $\Delta P^*$ based on the most up-to-date scale factors can be either performed by profile matching module 104G or by community management module 104D. Alternatively, the task can be shared between them. In still other embodiments, e.g., where social networks 110 are not complex and have few users U, updating module 104A can perform its tasks as well as those of modules 104G, 104D. In the simplest case, and as already explained above, updating module 104A compares profile changes $\Delta P^*$ by applying a resonance condition that looks for matches of the actual numerical values of scale factors in the corresponding domains. Also, a similar amount of change in the numerical values of the scale factors can be taken as an indication of resonance. In fact, even the sign of the change (positive or negative) in the values of the scale factors cab be taken as an indication of resonance.

In the present embodiment, the resonance test itself is implemented in a comparison step 154. During this step, profile changes $\Delta P^*$ of all users U belonging to group G that attended movie screening $E_i$ are compared. The users U whose profile changes $\Delta P^*$ as reflected by the scale factors indicate positive change in response to the movie are grouped together (note that in this case we do not use the norms or absolute values). These users U form subgroup SG whose profile change $\Delta P^*$ indicates a mutual resonance or consensus in their event responses $ER_i$. Differently put, they all show resonance with event $E_i$ based on positive change (increase) in the associated scale factors.

It is subgroup SG that is selected by community management module 104D to form a new community. Preferably, event-based updating module 104A indicates or flags subgroup SG to select it for follow-on communication and/or activities through community management module 104D. The follow-on communication by community management module 104O can be targeted specifically based on user profiles UP of users U of subgroup SG and may include any action such as advertising, surveying, community-building, booking services, post-event support services pre-event support services for upcoming events and any combination thereof.

It should be noted, that follow-on communication by community management module 104D may be indicated for some user or users U that are not members of subgroup SG. For example, users U that did not attend movie screening $E_i$ but are known to likely resonate with it based on their present non-updated user profiles UP can be included. Of course, post-event, or other additional advertising may be targeted at subgroup SG whether it is just based on users U that attended, or it includes these additional users U.

Meanwhile, users U of group G that attended movie screening $E_i$ and whose profile change $\Delta P^*$ is negligible or even zero, because the corresponding scale factors are unchanged show no resonance. During comparison step 154 such users U are tagged as irrelevant or unaffected. Since these users U do not resonate with movie screening $E_i$ no further follow-up or targeting by community management module 104D is prescribed.

Users U of group G that show profile change $\Delta P^*$ indicating anti-resonance with event $E_i$ are treated the same as those that were unaffected. In other words, the users U whose corresponding scale factors decreased in response to event $E_i$ are not flagged and no further follow-up or targeting by community management module 104D is prescribed. It should be noted, however, that anti-resonators can under some circumstances form a new community SG' that is based on disagreement or anti-resonance with movie screening $E_i$. For example, such new community SG' can organize around common dislike of event $E_i$.

In determining resonance, scaling factors can be thought of as influence. In other words, they are numerical representations of much does the corresponding profile attribute(s) influence resonance with a given domain D. We describe the change of user profile UP based on reaction to event E that is encoded in profile change $\Delta P^*$. In effect, a positive profile change, or equivalently an increase in the values of the corresponding scale factors indicates that user U now really cares about the cause. But we also need to describe the reverse case where what we identify which profile attributes associate with resonance in a domain D and recalibrate scale factors SFE. This is the function of profile matching module 104G.

The steps in the process of initial scale factor SFE setting (e.g., based on an educated guess) and recalibration are described in the flowchart of FIG. 13. We will refer to the same exemplary movie screening $E_i$ as the event in question. Scale factors SFE and domains $D_1, D_2, \ldots, D_n$ are defined as previously shown by the exemplary matrix representation of user profiles in FIG. 5.

In a first step 160, event producer EP or event sponsor ES associates event $E_i$ with either an existing domain $D_j$ or places it in an entirely new domain $D_o$, as described above. We will describe the case in which event $E_i$ is associated with an existing domain $D_j$, as the person skilled in the art will recognize that the addition of new domain $D_o$ can be readily implemented in a similar manner.

In the present example, the theme of movie $E_i$ is saving the oceans. Thus, existing domain $D_j$ for "Ocean Conservation" is chosen and movie $E_i$ about saving the oceans is associated therewith.

In step 162 an initial educated guess is made for corresponding scale factor $SFE_{ij}$ representing the expected resonance or influence of exposure to movie $E_i$ in column $D_j$ of the domain. In the present example, user $U_x$ has profile attributes including "scuba diver" and "male". A good educated guess is that "scuba diver" correlates 100% and positively with the value of scale factor $SFE_{ij}$. Meanwhile, "male" is uncorrelated to scale factor $SFE_{ij}$ either positively (resonantly) or negatively (anti-resonantly). Therefore, scale factor $SFE_{ij}$ is set to +1.0 in step 162.

When historical data associating profile attributes with given domain $D_j$ is available, the educated guess made in step 162 can be adjusted in an adjustment step 164. For example, if "scuba diver" tends to correlate 95% with domain $D_j$ for "Ocean Conservation", $SFE_{ij}$ can be adjusted to +0.95.

In step 166 local organizer(s) select movie $E_i$ and send offers to their friends as described above. In this step, profile data for the organizer(s) and invitees is extracted. Based on this step an initial confirmation of resonators can include the local organizer(s) and invitees that accept the offer, e.g., by indicating a commitment to attend. The output of step 166 an initial list of users U with intent to attend is compiled.

The output of step 166 may indicate a correlation between profile attribute(s) and intent to attend. For example, profile attribute "male" may be found to correlate strongly with intent to attend. Thus, in step 168 scale factor $SFE_{ij}$ can be further adjusted by including the correlation to profile attribute "male".

In step 170, application server 102 can review other user profiles UP given the newest scale factor $SFE_{ij}$ and profile attributes that correlate with it to suggest additional users U that have similar interest and should be invited. These suggestions can be sent to the local organizer to forward invitations to these additional users U. Alternatively, application server 102 can send the invitations directly.

In step 172, application monitors actual attendance at movie $E_i$ and sends necessary materials (surveys, etc.) to obtain event responses $ER_i$ from attending users U. Event responses $ER_i$ are then used as previously described to compute resonance in terms of scale factor $SFE_{ij}$ for each user U that attended. If educated guesses of scale factor $SFE_{ij}$ in step 162 and the consequent adjustments in steps 164, 168 were correct, then resonance data represented by computed value of scale factor $SFE_{ij}$ computed from actual event responses $ER_i$ should match the expected scale factor that was guessed and then adjusted.

Of course, it is unlikely that actually measured scale factors $SFE_{ij}$ for users U will exactly match the expected one for everyone. For better predictions in the future, the profile attributes of users U that did and did not exhibit the expected positive resonance can be analyzed. Scale factor $SFE_{ij}$ can then be updated using any available statistical method well known to those skilled in the art (e.g. least squares fit, weighted averaging, linear regression and the like). Scale factor $SFE_{ij}$ thus verified against actual data can now be used for educated guesses of future event involving movies on saving the oceans or for another showing of the same movie.

In general, there are two phases where the influence of profile attributes on a given domain D can be recalibrated by adjusting scale factor SFE. Once when users U see event materials 124, based on their intent to attend, and once again when they are surveyed after event E. In both cases we are testing the resonance with the content that is associated with the given domain D.

The new community can be identified by event-based updating module 104A with movie screening $E_i$ that precipitated its formation as sub-group SG of resonators. Furthermore, the same updating module 104A can map the new community to one or more other social groups based on shared causes. These social groups can be social networks 110. The determination of shared causes can be based on comparison of user profiles UP or other tests and metrics.

Furthermore, the data can be used for any other purposes described herein, such as follow-on communications and invitations to other events. In fact, in the system of invention it is preferred that event-based updating module 104A indicate subgroup SG, which is the new community, for follow-on communication by community management module 104D with items such as an advertisement, a survey, a community-building communication, a booking, pre-event support, post-event support and any combination of such items. Also, event-based updating module 104A can identify the new community with event $E_i$ and may map it to another social group that is not implementing the event-based new community formation based on a shared cause evident from resonance with event $E_i$.

FIG. 14 is a diagram showing how to use tensor spaces to handle some aspects of new community formation addressed by FIGS. 11 and 12. Specifically, it is advantageous to combine all users U that resonated with event $E_i$ as evidenced by their profile changes $\Delta P^*$ computed either by event-based updating module 104A or by profile matching module 104G and stored in community management module 104D. The combination can be performed with a linear combination or another suitable approach that extends beyond groups G. Thus, determination of subgroups SG in comparison step 154 can be expanded over many groups G.

In FIG. 14, users U that resonated with event $E_i$ and are thus potential members of subgroup SG of their own group G, are organized in columns ordered by group. Thus, column one corresponding to group $G_i$ contains resonating users $U_p$, $U_q$, $U_s$ as well as others not explicitly called out users indicated by ellipses. Column two corresponds to group $G_j$ and contains resonating users $U_p$, $U_q$, $U_s$, as well as others indicated by ellipses. Similarly, column three for group $G_k$ with resonating users $U_p$, $U_q$, $U_s$, as well as others indicated by ellipses is included. Still other columns representing other groups G can be included. Note that profile changes $\Delta P^*$ for all users are for ($D_{all}$) to indicate all relevant domains D. These could be either all domains D of the matrix representation of corresponding user profiles UP, or just those domains D in which changes in scale factors are registered after processing event responses $ER_i$.

The columns corresponding to resonating users U in groups $G_i$, $G_j$, $G_k$ and any other groups G are preferably combined by a linear combination operation 160 indicated by the composition sign. Typically, the space defined by such a combination is a tensor space that is of higher rank than the rank of the individual matrices representing user profiles UP. The advantage of forming a tensor representation is that new communities can thus be identified that span several groups G. Furthermore, potential correlation involving not only profile attributes but also other event responses ER, self-reports and network behaviors NB with respect to domains not originally associated with given event E can be more easily found by analyzing off-diagonal entries. Suitable methods are known in the art of linear algebra and more specifically tensor algebra.

The method and system of invention can be adapted to many different environments and network types. Also, the system can operate across a number of social networks, such as Facebook, Google+, Twitter, LinkedIn and the like. Furthermore, any user profile data already present in those social networks can be used by the method and system of the invention. Shopping behavior information, such as from Amazon, iTunes, NetFlix and YouTube can also be used. In some instances, such data can be used as information to aid in the educated guessing of scale factors prior to obtaining actual measured data based on event attendance and event responses.

Additionally, the method of invention can take advantage of outside information sources such social networks provide in the initial compiling of user profiles UP. This is especially true of users in group G, once this one has been identified. It is even more applicable for users of subgroup SG. In fact, the application server can retrieve observed network behaviors and/or self-reports or user data obtained in any other well-known manner from other social network profiles. For example, observed network behaviors are represented by a visual design of a profile page, media choices, media favorites and history can be collected from the various social networks.

Furthermore, third party services such as Facebook, YouTube and mobile content delivery services can be used in event material delivery and sharing. Since user profiles UP of users U can have profile information derived from such services, additional customization of content delivery is also possible.

In view of the above teaching, a person skilled in the art will recognize that the apparatus and method of invention can be embodied in many different ways in addition to those described without departing from the spirit of the invention. Therefore, the scope of the invention should be judged in view of the appended claims and their legal equivalents.

The invention claimed is:

1. A method for generating event-related decisions using digital event material, said method comprising:
    a) providing said digital event material and delivery parameters of an event E to at least one of a plurality of users U via a distribution server with a viral logic;
    b) enabling at least one group G of said users U to self-organize and to communicate a commitment to said event E through said viral logic;
    c) determining one or more event-related decisions with a rules engine based on a level of engagement of said users U and a predetermined threshold; and
    d) following occurrence of said event E, re-compiling user profiles UP of said at least one group G in a database of said user profiles UP having profile domains D with an event-based updating module based on event responses ER said users U and identifying a profile change $\Delta P^*$ in at least one of said profile domains D of said user profiles UP,
    wherein a new community is formed from said at least one group G based on (i) said profile change $\Delta P^*$ and (ii) said event responses ER of a subgroup SG of said at least one group G whose profile change $\Delta P^*$ indicates a mutual resonance.

2. The method of claim 1, wherein said support modules comprise a participant interaction module for supporting the steps of:
    a) connecting said users U via at least one network device to an application server having support modules enabled to maintain said database of said user profiles UP and mediate interactions involving said users U; and
    b) logging said users U into said social network.

3. The method of claim 1, wherein said event-based decision comprises at least one of (i) booking a venue, (ii) selecting a location, (iii) selecting a screen within said location, and (iv) canceling said event E.

4. The method of claim 1, further comprising indicating said subgroup SG with said event-based updating module for a follow-on communication through a community management module, wherein said follow-on communication through said community management module includes at least one action from the group consisting of advertising, surveying, community-building, booking services, pre-event support services, post-event support services.

5. The method of claim 4, wherein said follow-on communication is indicated for at least one of said users U not in said subgroup SG.

6. The method of claim 4, wherein said digital event material comprises a preview associated with said event E, said event E is a movie screening and said action comprises pre-event advertising, post-event advertising, booking, surveying and community-building.

7. The method of claim 1, further comprising monitoring reactions of said users U to said digital event material, wherein said level of engagement of said users U is determined based upon how often said users U respond to said digital event material with one or more of clicking, liking, sharing, joining an e-mail list, watching a video that is part of said digital event material, registering with the presenter of the digital event material, and downloading an application from the presenter of the digital event material.

8. The method of claim 7, further comprising obtaining user profiles UP of users U who register by logging in using respective social media credentials.

9. The method of claim 1, further comprising scheduling and delivery of said digital event material by said distribution server and a venue reporting module to a physical event venue of said event E.

10. The method of claim 1, further comprising sharing said level of engagement with said users U on said social network via at least one user network device.

11. The method of claim 10, further comprising formatting said level of engagement in a format belonging to the group consisting of smartphone notifications, e-mails, phone calls and SMS messages.

12. The method of claim 1, further comprising configuring said event-based updating module to receive said event responses ER in a format comprising at least one of a rating, a structured response, an unstructured response.

13. The method of claim 1, wherein said event E belongs to a group of physical events including film screenings, concerts, book signings, speaking events, conferences, un-conferences, art shows, festivals, athletic events, religious events, political events, protests, games, parties, dinners, receptions and poker nights.

14. The method of claim 1, wherein said digital event material comprises at least one of a preview, a movie, a movie trailer, a digital presentation, a digital book, a digital score, a digital statement, a digital audio file, a digital game and any combination thereof.

15. The method of claim 1, wherein said digital event material further comprises an advertisement and wherein said viral logic selects said advertisement based on said user profiles UP of users U belonging to said group G.

16. The method of claim 1, further comprising sharing among said group G a status of reservations to said event E with a participant interaction module.

17. The method of claim 1, further comprising supporting a local organizer function of at least one local organizer of said group G chosen among said users U with a local organizer module.

18. The method of claim 17, further comprising supporting by said local organizer module a direct connection between said at least one local organizer with said rules engine for privileged interactions.

19. The method of claim 1, further comprising compiling from self-reports and observed network behaviors of said users U said database of said user profiles UP having said profile domains D and retrieving said observed network behaviors from other social network profiles of said users U.

20. The method according to claim 1, wherein said commitment to said event E is inferred based upon responses of said users U to said digital event material.

* * * * *